(12) United States Patent
Presler

(10) Patent No.: US 11,196,978 B2
(45) Date of Patent: Dec. 7, 2021

(54) DIGITAL CAMERA SYSTEM FOR RECORDING, EDITING AND VISUALIZING IMAGES

(71) Applicant: Ari M. Presler, Niskayuna, NY (US)

(72) Inventor: Ari M. Presler, Niskayuna, NY (US)

(73) Assignee: Silicon Imaging Corporation, Delray Beach, FL (US)

( * ) Notice: Subject to any disclaimer, the term of this patent is extended or adjusted under 35 U.S.C. 154(b) by 173 days.

(21) Appl. No.: 16/712,769

(22) Filed: Dec. 12, 2019

(65) Prior Publication Data

US 2020/0120327 A1 Apr. 16, 2020

Related U.S. Application Data

(63) Continuation of application No. 15/425,935, filed on Feb. 6, 2017, now Pat. No. 10,511,825, which is a
(Continued)

(51) Int. Cl.
*H04N 13/204* (2018.01)
*H04N 5/225* (2006.01)
(Continued)

(52) U.S. Cl.
CPC .......... *H04N 13/189* (2018.05); *G03B 17/56* (2013.01); *H04N 5/225* (2013.01); *H04N 5/22521* (2018.08); *H04N 5/23206* (2013.01); *H04N 5/23299* (2018.08); *H04N 5/232933* (2018.08); *H04N 5/232939* (2018.08);
(Continued)

(58) Field of Classification Search
CPC .. H04N 13/189; H04N 13/204; H04N 13/257; H04N 13/194; H04N 13/239; H04N 13/161; H04N 13/275; H04N 5/232939; H04N 5/23299; H04N 5/3765; H04N 5/378; H04N 5/772; H04N 5/765; H04N 5/781; H04N 5/85; H04N 5/907; H04N 9/7921; H04N 9/804; H04N 5/232933; H04N 5/22521; H04N 5/225; H04N 5/23206; G03B 17/56
See application file for complete search history.

(56) References Cited

U.S. PATENT DOCUMENTS 115,901 A 6/1871 Smith et al.
169,532 A 11/1875 Evans
(Continued)

FOREIGN PATENT DOCUMENTS

| JP | 2002223385 A | 8/2002 |
|---|---|---|
| JP | 2007096412 | 12/2007 |
| WO | WO-9509510 A1 | 4/1995 |

OTHER PUBLICATIONS

Silicon Imaging, Silicon Imaging S1-1920HD MegaCamera 1080P/24/30/60 12-bit High-Definition Camera, 2004 XP002682243, whole document.
(Continued)

*Primary Examiner* — Twyler L Haskins
*Assistant Examiner* — Fayez A Bhuiyan
(74) *Attorney, Agent, or Firm* — Matthew J. Spark; Stefan J. Kirchanski; Zuber Lawler LLP

(57) ABSTRACT

A digital camera system includes an optical assembly to gather light from a desired scene, a modular imaging subsystem aligned with the optical assembly, and an image processing, recording and display subsystem.

70 Claims, 12 Drawing Sheets

Related U.S. Application Data continuation of application No. 12/595,811, filed as application No. PCT/US2008/060272 on Apr. 14, 2008, now Pat. No. 9,565,419.

(60) Provisional application No. 60/923,339, filed on Apr. 13, 2007.

(51) Int. Cl.

| | | |
|---|---|---|
| *G03B 17/56* | (2021.01) | |
| *H04N 5/232* | (2006.01) | |
| *H04N 13/189* | (2018.01) | |
| *H04N 5/77* | (2006.01) | |
| *H04N 13/257* | (2018.01) | |
| *H04N 13/194* | (2018.01) | |
| *H04N 13/239* | (2018.01) | |
| *H04N 13/161* | (2018.01) | |
| *H04N 13/275* | (2018.01) | |
| *H04N 5/376* | (2011.01) | |
| *H04N 5/378* | (2011.01) | |
| *H04N 5/765* | (2006.01) | |
| *H04N 5/781* | (2006.01) | |
| *H04N 5/85* | (2006.01) | |
| *H04N 5/907* | (2006.01) | |
| *H04N 9/79* | (2006.01) | |
| *H04N 9/804* | (2006.01) | |

(52) U.S. Cl.
CPC .......... *H04N 5/378* (2013.01); *H04N 5/3765* (2013.01); *H04N 5/772* (2013.01); *H04N 13/161* (2018.05); *H04N 13/194* (2018.05); *H04N 13/204* (2018.05); *H04N 13/239* (2018.05); *H04N 13/257* (2018.05); *H04N 13/275* (2018.05); *H04N 5/765* (2013.01); *H04N 5/781* (2013.01); *H04N 5/85* (2013.01); *H04N 5/907* (2013.01); *H04N 9/7921* (2013.01); *H04N 9/804* (2013.01)

(56) References Cited

U.S. PATENT DOCUMENTS

| | | |
|---|---|---|
| 212,970 A | 3/1879 | Nesbitt |
| 218,099 A | 7/1879 | Whittier |
| 231,630 A | 8/1880 | Steinway |
| 233,236 A | 10/1880 | Guest |
| 3,295,425 A | 1/1967 | Bing et al. |
| 4,281,909 A | 5/1981 | Ishibashi et al. |
| 4,667,226 A | 9/1987 | Glenn |
| 5,221,964 A | 6/1993 | Chamberlain et al. |
| 6,064,533 A | 5/2000 | Kenin et al. |
| 6,198,505 B1 | 3/2001 | Turner et al. |
| 6,788,338 B1 | 9/2004 | Dinev et al. |
| 7,113,203 B1 | 9/2006 | Wu et al. |

OTHER PUBLICATIONS

ARRI, ARRIFLEX D-20, 2006; p. 1-12.
EP08745798 2 Extended Search Report dated Sep. 4, 2012.
Webpage: Silicon Imaging S1-1920HD MegaCamera, 2003.
Webpage: Silicon Imaging and P+S Technik, 2002.
Webpage document: Red One Camera, 2012.

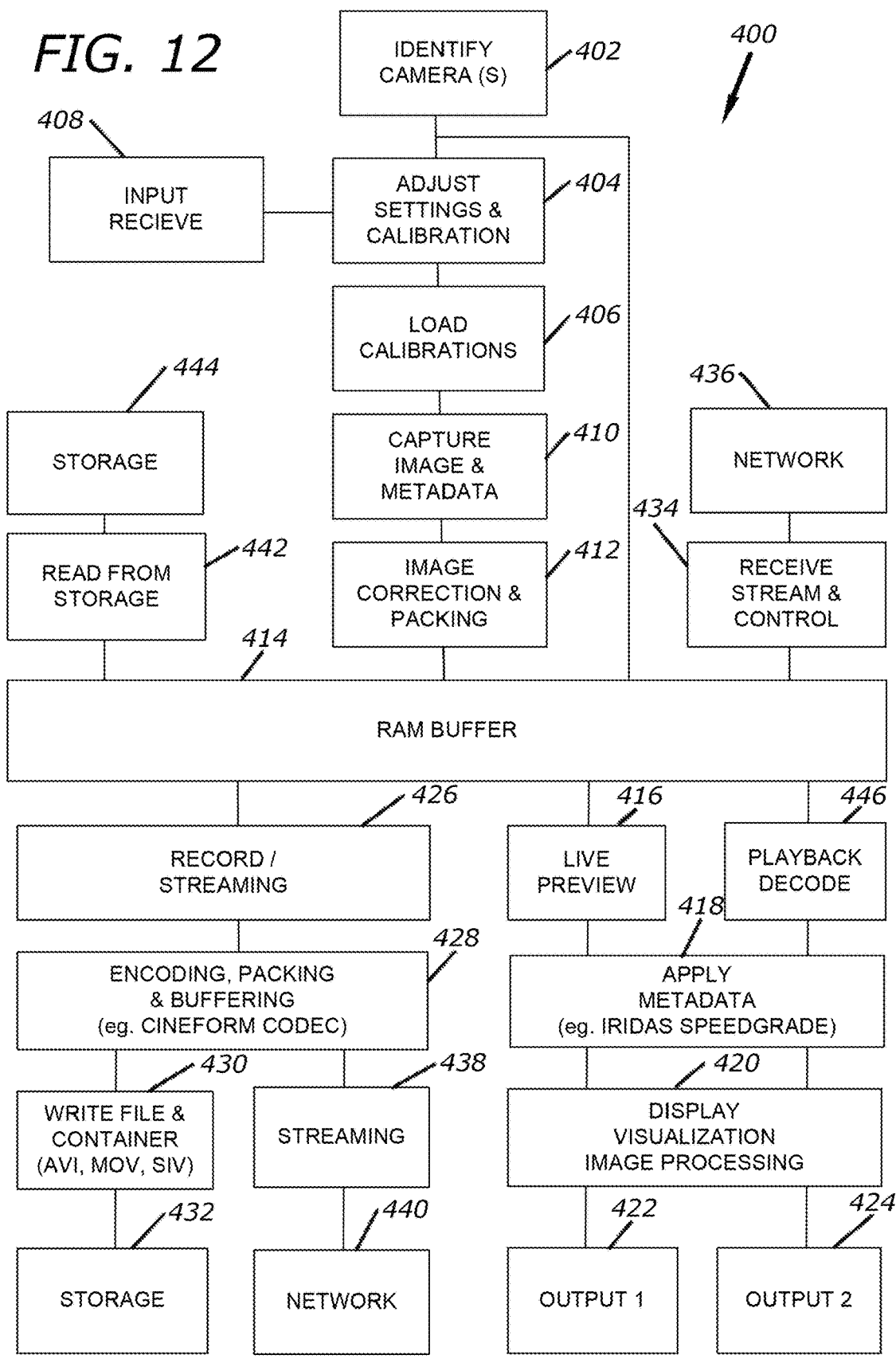

DIGITAL CAMERA SYSTEM FOR RECORDING, EDITING AND VISUALIZING IMAGES

CROSS-REFERENCE TO RELATED APPLICATION(S)

This application is a continuation of, and claims priority from and the benefit of the following applications: U.S. Non-Provisional application Ser. No. 15/425,935, filed Feb. 6, 2017, issued as U.S. Pat. No. 10,511,825 on Dec. 17, 2019, which is a continuation of U.S. Non-Provisional application Ser. No. 12/595,811, filed Oct. 13, 2009, issued as U.S. Pat. No. 9,565,419 on Feb. 7, 2017, which is the U.S. National Stage Entry of PCT Application Serial No. US08/60272, International Filing Date Apr. 14, 2008, now expired, which claims the benefit of U.S. Provisional Application Ser. No. 60/923,339, filed Apr. 13, 2007, now expired, the entire content of which are incorporated herein by reference.

FIELD OF THE INVENTION

The present invention is related, in general, to a digital cinema camera system. More particularly, the present invention is related to a digital cinema camera system for recording, editing and visualizing images.

BACKGROUND OF THE INVENTION

For many years, film cameras were the only option for capturing cinema quality motion pictures. The time requirements and costs related to shooting and processing motion picture images on film stock and then transferring those images into a digital form have created a need for motion picture cameras that capture high definition or cinema resolution imagery directly in a digital form. The advent of Digital Cinemas, cost effective Stereo 3D Digital cinema projection systems and establishment of Digital Cinema Initiative SMPTE Standards has fueled the need for more content creation for delivery at 2K, 4K and Stereo formats.

Accordingly, there is a need for a digital camera system that meets the needs described above that reduces costs. There is also a need for a digital camera system that leverages digital processing and visualization tools. There is a further need for a digital camera system that provides user feedback and metadata collection when shooting special effects, compositions and stereo or multi-camera content. There is an additional need for a digital camera system that improves flexibility in networked collaboration, enables separated imaging block and recording, has a simple workflow with metadata management and, importantly, maintains film-like reproduction qualities and camera operation. There is also a need for a digital camera system that not only provides the capabilities described above but can also utilize existing cabling infrastructure, broadcast signal monitoring and transmission systems. There is a need for a digital camera system that mixes broadcast standard digital sources into a recording and visualization system, as well as generate broadcast standard and network streaming outputs for 2D and 3D content.

In the past few years, while several digital cinema cameras have emerged on the market these digital cinema cameras are complex designs with limited connectivity that are only able to address a limited set of the needs described above. For example, these digital cinema cameras are incompatible with existing cable infrastructure. Also, these digital cinema cameras either completely lack network management or are capable of only minimal network management (i.e., only simple controls that lack full image streaming or metadata management). Further, these digital cinema cameras lack the ability to capture or record multi-sensor 2K or 4K image data using a single control application. Additionally, these digital cinema cameras lack visualization tools or metadata integration. These digital cinema cameras do not utilize existing broadcast infrastructure to transmit multi-resolution data and have complex workflows with respect to stereo 3D and multi-camera content acquisition, broadcast and network transmission either live or in a post-production process. These digital cinema cameras are limited to 1920×1080 image sensor pixel arrays that require the use of a multiple sensor prism block which, in turn, requires use of complex and expensive optics. These digital cinema cameras utilize dedicated hardware functions with no or limited image processing flexibility or upgrade capability. Dedicated hardware functions utilized by these digital cinema cameras include video processing to perform non-reversible color space transformations or sub-sampling to formats, such as YUV 4:2:2 and 4:4:4, as standard broadcast signals. These digital cinema cameras implement a variety of proprietary compression and coding schemes that introduce visible image artifacts, especially when projected on large screens. While a number of these digital cinema cameras can generate preview imagery for display on an electronic viewfinder, these digital cinema cameras can only do so with limited resolution or visualization tools. High-resolution outputs from these digital cinema cameras are restricted to transmission in SMPTE standard resolution and formats. These digital cinema cameras often output imagery to be record on restrictive, proprietary or large external storage devices. These storage devices include a tape storage system having only linear data access, Non-Volatile Flash or RAM drives with limited storage, and multiple hard disk drive RAID storage systems which are often non-portable and whose media cannot be easily removed or transported for direct use in other systems. Also, the files stored on these storage devices have limited color correction, image processing or post-production metadata integration.

In recent years, many digital still cameras or dual-mode video and still camcorders have also been developed which use single image sensors with color filter arrays. These digital still cameras and camcorder devices do use higher resolution sensors (e.g., HD (1920×1080) camcorders, digital single-lens reflex camera (DSLR) are now 10 MP and higher). However, these digital still cameras and camcorders have slow readout architectures (e.g., a DSLR may only shoot four (4) frames per second) and can only achieve video rate preview at low resolution (e.g., 640×480) or standard definition (e.g., VGA 640×480 at thirty (30) frames per second) using sub-sampling or windowing techniques. These digital still cameras and camcorders use dedicated hardware functions or targeted function digital signal processors (DSP) to perform image processing to interpolate and colorize the raw image data from the image sensor. These digital still cameras and camcorders compress the colorized images for storage; but the compressing process performed by these devices prevents access to the original full raw image pixel data for later processing, analysis or colorization. In addition, the interpolation and color processing applied to the source raw data in those devices initially generates data sets that are larger than the source raw data which, in turn, requires the application of higher compression to fit the data sets into a target storage capacity.

This typically results in a reduction in image quality compared to the original image or a coded version of the raw data.

A few single sensor cameras have been developed for use in 2K and 4K acquisitions in raw format. However, these cameras use dedicated hardware or targeted function DSPs to perform image processing to interpolate, colorize and display preview quality output and simultaneously compress the raw sensor image data for later digital editing and grading. Also, the compression method and metadata employed by these cameras foreclose the dynamic retrieval of alternative resolution or representations at different bit rates during recording for network streaming, remote grading or adaptive editing. Due to their architectures, these single sensor cameras must apply high compression to fit data into target internal storage capacity devices. Also, due to their architectures, these single sensor cameras lack the ability to transmit the imager raw content over existing broadcast or network infrastructure cabling for remote monitoring, networking, recording or visualization. These single sensor cameras cannot process captured signals with prerecorded content or broadcast format signals for live composition, switching, grading, mixing into virtual sets or adding graphic overlays based on extracted metadata or analytics. These single sensor cameras also lack the ability to manage, control or record multi-sensor imagers, which may be remotely connected to a recording system.

In recent years, there has been an interest in producing digital cinema quality 3D stereographic, wide-dynamic and immersive content using multiple imagers. This has created a need for more efficient modular and scalable cameras and workflow solutions. There is a further need for a digital camera system having a precise synchronization mechanism to enable images to be mixed or stitched without motion artifacts. While digital camera systems have been used to produce this type of content, these camera systems suffer from the same system limitations as the cameras described above. These camera systems are mostly comprised of stand-alone cameras, each with individual controls, viewing and recording systems, with no integration mechanism other than a common sync signal (i.e., there is no communication between camera controls or viewing and recording settings). These camera systems are large and bulky such that the camera systems cannot be placed very close together physically, as is required for short inter-ocular distances in 3D stereographic or for creating hemispherical views where cameras need to be placed as close together as possible from a common center point. When shooting thru mirrors and beam splitters, rigs (i.e., a combination of digital cameras, optics and mounting platform) become more cumbersome and difficult to use in handheld shooting environments. Finally, these camera systems lack a comprehensive set of image processing, visualization, positioning control, recording, playback, communications and display tools for use in such high-definition multi-camera systems.

SUMMARY OF THE INVENTION

The present invention as described herein discloses a digital camera system that captures scalable resolution, bit-depth and frame rate raw or color processed images from one or more modular imaging modules at precise film or video rates, can utilize industry standard cabling infrastructure for transmitting either the raw sensor data or processed raw on the same or different links, provides a mechanism for timing synchronization of exposure and readout cycles from multiple imaging modules, uses a unified software or operator interface to control the capture, processing and non-destructive visualization from one or more imaging modules, can optionally combine the live imagery with previously stored imagery or computer generated virtual sets and simultaneously record the raw, broadcast format, or visualization processed imagery in its original or near original representation. The processor can be used to compress the imagery with an encoder, which can generate multiple streams one for the purpose of recording at highest quality and optionally additional streams at lower data rates for remote transmission. It enables the recording of one or multiple image streams using a common removable storage device or across multiple devices for increased throughput. The recording can make use of a single file containing the streams from multiple imaging modules with metadata to enable the selective playback of one or more streams. The output processing can include mixing the imagery from the multiple streams for display on standard computer or broadcast monitoring devices or processed for output on specialized stereographic displays that require formatting and synchronization from dual image streams. Utilizing metadata encoded in the recorded stream or generated thru user input during playback the relative position, color transformation and format of the dual streams, representing the left and right eye content, can be adjusted to change the stereographic effect and depth perception on these displays.

This invention enables reduced complexity for capturing imagery from one or more image modules, enables remote image sensing and frame grabbing with transmission using existing industry standard broadcast and networking infrastructure, improves storage and processing efficiency, provides increased flexibility and tools visualization, networking, analysis and mixing of prerecorded or computer generated data, and delivers unique display modes 2D and 3D representation of the multiple streams during live, recording, playback or post processing. The disclosed digital camera system may include optics, one or more imaging modules, a frame grabber, a processor, software, user input mechanism, a display, synchronization mechanism, networking means and storage means. In addition, a configuration is disclosed for a portable digital camera and recording system capable of HD, 2K and 4K stereo-3D or wide-dynamic multi-image acquisition using two image sensing modules and separated image processing, recording and display subsystem.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. Throughout the drawings like reference numbers indicate like exemplary elements, components, or steps. In such drawings:

FIG. 12 is a flow chart for SiliconDVR software associated with the present invention.

DETAILED DESCRIPTION OF THE PREFERRED EMBODIMENTS

Figure 1:
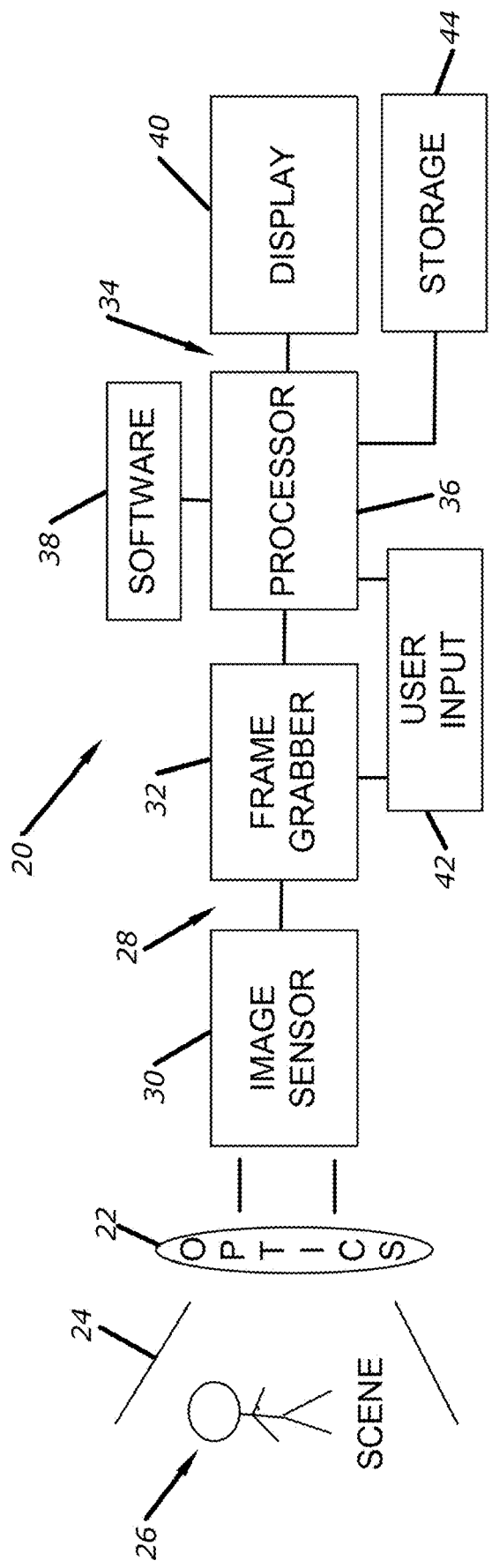
FIG. 1 is a block diagram of a digital camera system embodying the present invention.

As shown in FIGS. 1-12 for purposes of illustration, the present invention resides in a digital camera system that captures scalable resolution, bit-depth and frame rate raw or color processed images from one or more modular imaging modules at precise film or video rates. The present invention utilizes industry standard cabling infrastructure for transmitting either the raw sensor data or processed raw on the same or different links. The present invention provides a mechanism for timing synchronization of exposure and readout cycles from multiple imaging modules. The present invention also provides a unified software or operator interface to control the capture, processing and non-destructive visualization from one or more imaging modules. The present invention can optionally combine live imagery with previously stored imagery or computer generated virtual sets, while simultaneously recording the raw, broadcast format, or visualization processed imagery in its original or near original representation. The present invention discloses a processor that can be used to compress the imagery with an encoder, which can generate multiple streams one for the purpose of recording at highest quality and optionally additional streams at lower data rates for remote transmission. The present invention enables the recording of one or multiple image streams using a common removable storage device or across multiple devices for increased throughput. The recording can make use of a single file containing the streams from multiple imaging modules with metadata to enable the selective playback of one or more streams. The output processing can include mixing the imagery from the multiple streams for display on standard computer or broadcast monitoring devices or processed for output on specialized stereographic displays that require formatting and synchronization from dual image streams. Utilizing metadata encoded in the recorded stream or generated thru user input during playback the relative position, color transformation and format of the dual streams, representing the left and right eye content, can be adjusted to change the stereographic effect and depth perception on these displays.

The present invention enables reduced complexity for capturing imagery from one or more image modules, enables remote image sensing and frame grabbing with transmission using existing industry standard broadcast and networking infrastructure, improves storage and processing efficiency, provides increased flexibility and tools visualization, networking, analysis and mixing of prerecorded or computer generated data, and delivers unique display modes 2D and 3D representation of the multiple streams during live, recording, playback or post processing. The present invention discloses a digital camera system that includes optics, one or more imaging modules, a frame grabber, a processor, software, user input mechanism, a display, synchronization mechanism, networking means and storage means. In addition, a configuration is disclosed for a portable digital camera and recording system capable of HD, 2K and 4K stereo-3D or wide-dynamic multi-image acquisition using two image sensing modules and separated image processing, recording and display subsystem.

An embodiment of the present invention in the form of a digital camera system 20 is illustrated in FIG. 1 and described below in order to provide an overview of the camera system 20 as well as various components of the system 20 and their respective functions. The camera system 20 includes an optical assembly 22 to gather light 24 from a desired scene 26. The system 20 also includes a modular imaging subsystem 28 aligned with the optical assembly 22 to receive light 24 gathered and/or modified by the optical assembly 22. The modular imaging subsystem 28 comprises one or more imagers 30 and at least one frame grabber 32. The imager 30 captures high definition raw images at film or video rates for HD, 2K and 4K, cinema quality production. The imager 30 can come in various forms including, without limitation, at least one pixilated image sensor unit having one or more arrays of pixels, a pickup tube, a semiconductor detector or the like. The pixilated image sensor unit can come in various forms including, without limitation, a complimentary metal-oxide semiconductor (CMOS) active-pixel image sensor, a metal-oxide semiconductor (MOS) active-pixel image sensor, a charge-coupled device (CCD), a contact image sensor (CIS) or other pixilated detection devices. A single image sensor 30 may include color filters that are used to capture a representation of the full color images.

The optical assembly 22 includes optics (e.g., lenses). The system 20 includes a lens mount (not shown) that interconnects the optical assembly 22 and the modular imaging subsystem 28. The lens mount can come in various forms including, without limitation, a fixed optical interface mount, an interchangeable lens optical interface mounting system or the like. Thus, the lens mount can provide for film or video lenses to be removably connected to the modular imaging subsystem 28. The interchangeable lens mount is a precise mounting surface and locking mechanism, which enables field exchange of the lens mount to support the use of a-variety of industry standard lenses such as, PL, Nikon-F, Panavision, Leica, C and Canon. An interchange lens mount with an integrated optic enables the use of B4 optics (originally designed for use with three-sensor prism cameras) on a single-sensor based camera unit. In the alternative, the image sensor unit may have an integrated lens.

The image sensor unit 30 includes a plurality of adjustment mechanisms (not shown) to adjust the position of the image sensor unit relative to the optical center of lens projection and/or to adjust the co-planarity of a sensing plate (i.e., the surface which holds the sensor circuit board of the image sensor) relative to the optical interface mount. The image sensor unit 30 also includes a mechanism for back focus adjustment. Any of the adjustment mechanisms can include an electronic positioning device for remote operation for moving the sensor(s), optics, camera(s) or rig(s). In the alternative, the image sensor unit 30 may be integrated with an optical beam splitter or rotating shutter mechanism to enable the use of an optical viewfinder while continuing to acquire imagery. In another alternative, an electronic display unit can be mounted into the optical beam splitter mechanism to enable selectable operation as an optical or electronic viewfinder or as a combination optical viewfinder with virtual electronic image display.

An optical device (not shown), such as an RGB prism, may be positioned in front of the optical assembly 22 so that a plurality of pixilated sensor units 30 in the imaging subsystem 28 capture color-separated channels. Alternatively, a plurality of pixilated image sensor units 30 and beam splitting optics may also be used to capture a wide dynamic range representation of light 24 from the scene 26, where each pixilated image sensor unit 30 captures a range of scene intensity (i.e., each sensor will have a bounded range of intensity that the sensor can accurately detect or measure based on the capacity of sensitivity and setting of the camera and its sensor (e.g., one cannot typically see details of both the Moon and the Sun in the same scene). Signals from each of the plurality of image sensor units 30 can be processed and combined into a single image representing a wider range of scene intensity than can be accomplished with a single image sensor unit 30. Each image sensor unit 30 is capable of outputting multiple readouts from the at least one array of pixels with varying integration times for each pixel of the array during a single frame time, to be later combined to achieve a wide dynamic representation of light 24 from the scene 26. The multiple exposure readout per frame can be applied to single or multiple image sensor unit configurations.

The image sensor unit 30 contains a time base and controller with precision to enable audio synchronization. The pixel data is readout of the image sensor unit 30 at variable clock speeds or resolutions and is captured via the frame grabber 32. The images output from the image sensor unit 30 may be captured by the frame grabber 32 either continuously or on an intermittent basis. The image sensor unit 30 can operate stand alone to generate and output image data over a high speed data link to the remote frame grabber 32. The image sensor unit 30 includes local inputs (e.g., sensor input, motor encoders, timecode, triggers, etc.) and can generate external sync and control signals (i.e., signal output which can be used to synchronize other cameras to the first camera's timebase; control can be for lens, motors, lights, etc.). The image sensor unit 30 can also accept synchronization and clock source reference from the frame grabber 32 (i.e., the frame grabber 32 gets the external sync information and sends the external sync information to the sensor or operates the sensor timing).

The image sensor unit 30 can operate in either a continuous mode or a skip frame output mode. The image sensor unit 30 can also operate in a readout mode at a rate greater than the desired capture frame rate (i.e., the rate at which data is captured by the frame grabber 32), generally twice the desired capture frame rate, and can produce an associated synchronization signal (e.g., once for every two images). This synchronization (or sync) signal can be used to instruct the frame grabber 32 to capture the intermittent or alternating frames, with specific timing relative to the top of frame readout. The sync signal can be output for external synchronization of additional cameras (e.g., sensor units, camera modules, etc.). The sync signal can also be received by the image sensor unit 30 from external sources (e.g., another image sensor unit 30, modular imaging systems (i.e., imager and frame grabber), a master sync generator which generates sync signals for all sensor units or camera modules). In this manner, the image sensor unit 30 can be programmed as a master to output the sync signals or as slave to receive a synch signal from external sources. An input (i.e., command via hardware (from external signal device (keypad), or from the frame grabber 32 thru software initiation from a recorder) to the image sensor units 30 can be used to set the operation either as a master or a Slave camera. An input can also be used to select a skip or non-skip synchronization mode. In a skip mode, the master camera (i.e., the master sensor unit) will only output a synch pulse at the top of frame of each frame that should be grabbed (i.e., captured by the frame grabber 32). The slave camera (i.e., the slave sensor unit) which is programmed for skip mode, will receive a pulse every other frame scanned from the master to begin a synchronized readout of a frame pair. The double speed readout skip capture mode allows reduced motion blur with a faster readout and also enables the use of a mechanical shutter, such as a rotating mirror shutter of the type used on traditional film cameras, with a rolling shutter readout sensor, such as are commonly found on CMOS image sensors, wherein the image exposed during the open period of the mechanical shutter can be readout during the closed period.

The frame grabber 32 includes an on-board memory (not shown) to capture full frame images (from a single or multi-exposure readout image data) or buffer the image data for transfer to a processing subsystem 34 having an associated memory (i.e., a RAM part of the frame grabber 32). The frame grabber 32 can be used for image pre-processing that includes, without limitation, noise and pixel defect correction, binning, sub-sampling, black frame offset correction, multi-exposure data mixing, data packing or data coding which may be lossy or lossless.

The frame grabber 32 is able to receive input from external components and/or from the processing subsystem 34 to initiate specific actions which may include triggers for timing synchronization or event initiation (e.g., timing synchronization of readout and event initiation such as "Start recording" or "move lens"). The external inputs can be de-bounced and re-timed relative to the image readout cycle to enable precise record start event synchronization.

The frame grabber 32 includes a time code reader (not shown) and a timing unit (not shown) for matching time reference with other system devices, such as an audio recorder (not shown). The time code reader obtains a time reference from a master source and the timing unit keeps the time like a clock. The timing unit can set its reference time from an external time code source. The time code generator is a clock which has an output connection to allow other devices to receive the current time and set its clock to match it. The timing unit (i.e., the clock) may contain a charge-storing device, such as a large capacitor, which can enable continued operation and time keeping when an external power source (not shown) is disconnected from the system 20. The system 20 may also be powered by a battery (not shown).

The frame grabber 32 may also generate outputs for controlling various devices including, without limitation, motors such as pan and tilts to position the camera (i.e., the image sensor unit 30), rotating shutters (i.e., spinning mirrors like those used on traditional film cameras), slide motion stages (i.e., that slide along a rail from the left to right side of a stage along a beam) or lens motors for zoom, focus or iris, which may be used to control a stereo 3D rig or lighting such as strobes. The frame grabber 32 can also generate synchronization signals for multi-camera operation. The frame grabber 32 can also receive external information from sensors (e.g., positioning encoders, laser distance sensors, microphones), rotating shutter position detectors, time code generators and positioning devices. The external information received by the frame grabber 32 can be used for system control and transmitted along with the imagery (i.e., the data from image sensors which can be raw or processed, codec or uncoded) for recording as metadata or user interface feedback. The frame grabber 32 can also accept audio signal input, which can be processed and mixed into the image data stream for-transmission. The audio source is another data source. It is desirable to transmit the audio together to keep lip sync with the images (e.g., sounds heard correspond to images of a mouth making those sounds).

The frame grabber 32 can be used to generate color processed RGB or transformed YUV imagery at the time base of the readout from the image sensor unit 30 or scan-converted for output at a different rates. An external sync reference signal can be used to establish the rate and phase for the scan-converted output. The frame grabber 32 can output the imagery (i.e., a sequence of motion pictures) as standard definition, high definition (digital or analog signaling) or computer output formats.

The frame grabber 32 can be housed with the image sensor unit 30 in a shared housing or enclosure (not shown). In the alternative, the frame grabber 32 can be remotely connected to the image sensor unit 30 in order to allow a smaller form factor sensor unit (i.e., a camera head sized to fit into a hand, put on a goal post for sports, etc.). Combined in the same housing, the image sensor unit 30 and the frame grabber 32 (i.e., modular imaging system 28) comprise a modular camera unit 28 which can operate either standalone with an output for display or can be connected to a processing sub-system 34, capable of operating one or more modular camera units 28. The modular camera unit 28 can be removably docked (i.e., electro-mechanically connected) to the processing sub-system 34, or can be detached from the processing sub-system 34 for remote camera unit operation (i.e., remote operation of the modular imaging system 28) via wired or wireless connections. A docking mechanism (not shown) provides electro-mechanical connection of the modular camera unit 28 and the processing sub-system 34 that enables field insertion or removal of the modular camera unit 28 from the processing sub-system 34. In the docked position, the modular camera unit 28 can receive power and controls from a processor 36 comprising a portion of the processing sub-system 34 and can also transmit images (i.e., image data) and metadata to the processor 36 using the docking connections.

The modular camera unit 28 can communicate imagery (i.e., data from image sensors which can be raw or processed, codec or uncoded) using a data link and may generate an output display of the motion pictures. The data link or data channel between the frame grabber 32 and the processor 36 can transfer the raw or processed image data at variable speeds, which may be below, at or above the readout rate of the image sensor unit 30. In the case of the capacity of the data channel being less than the rate of readout from the image sensor unit 30, multiple images can be buffered in the local memory of the frame grabber 32 and images transmitted using a first in, first out (FIFO) basis or in a skipped frame fashion. All imagery may be buffered until the memory of the frame grabber 32 is filled and then emptied at the available data channel rate. A-subset of the imagery being captured into the local memory of the frame grabber 32 can be transmitted to obtain a live preview display. The modular camera unit 28 can generate multiple data streams with varying bit rates that are simultaneously transmitted over a single or multiple data links. The data transmission link from the image sensor unit 30 to the frame grabber 32 or from frame grabber 32 to the processor 36 may use existing infrastructure broadcast transmission media, such as 1.5 Gigabit/sec or 3.0 Gigabit/sec capable links including Coax and triax, wireless links, fiber optics or network cables, such as CAT-5e, to transmit either the raw 2K or 4K image data or SMPTE format RGB and YUV serial digital data. The raw or color processed data, either coded or uncoded, can be transmitted on the same data transmission link. The data transmission link can also be used to simultaneously transmit the raw and processed data in either coded or uncoded formats. This enables a very high quality data set to be used for recording, while another data set is used for remote transmission or display. The data transmission links using coax or triax can incorporate a reverse control channel modulated onto the cable, from a remote processing sub-system 34. Additionally, power can be received on the triax connection. In this way, a single cable can be used for image and metadata transmission as well as control and power.

A modular camera unit 28 that uses a 2K image sensor unit 30 can use a at least one SMPTE 1.5 Gigabit/sec HD link to transmit 2K raw image data at fifty (50) images per second with 10-bit per pixel data. A modular camera unit 28 that uses a 4K image sensor unit 30 can use two or more 3-Gigabit per second links to transmit 4K raw images at minimum of 23.97 images per second with at least 10-bit precision. The 4K image sensor unit 30 can transmit image data at a minimum of 5.1 Gigabit/second and the modular camera unit 28 using the 4K image sensor unit 30 can transmit data at a minimum of 2.55 Gigabit/second. A sensor unit 30 or camera module 28 may use a four pair network cable with up to three pairs carrying data to the frame grabber 32 and the fourth pair for reverse control and optional feedback (which may include a digitally encoded display stream for output). An alternate configuration can use the network cable as a single Gigabit Ethernet connection from the frame grabber 32 that can be used to transmit 12-bit raw uncompressed data at over 100 MB/sec to enable capturing of 2048 by 1152 resolution imagery (i.e., RAW data which may or may not be coded by the frame grabber 32) at up to twenty five (25) images per second, even if the sensor unit has 4K resolution. In a sensor windowing mode, the frame grabber 32 can transmit 1280 by 720 resolutions at rates faster than standard 720P video and film rates, up to eighty five (85) images per second. At a resolution of 960 by 540, a rate of one hundred fifty (150) images per second can be achieved. Similarly, other resolutions and over-cranking frames rates can be achieved-within the channel limits of the link rate. Using coding methods on the data, higher resolutions and frame rates can be transmitted, including but not limited to cinema 4K. The Gigabit Ethernet link may use power-over-ethernet or additional dedicated wire pairs alongside the Ethernet, to achieve a single connection for power, data and control.

Data received by the processing sub-system 34 includes, without limitation, image data, metadata, control signals or the like. The metadata may include information pertaining to the frame grabber 32, the image sensor unit 30, camera or lens settings, scene data, or external inputs (e.g., audio, global positioning system (GPS), Timecode or motor position feedback. The control signals may include functions for synchronization and event initiation such as starting and stopping of recordings.

The processor 36 of the processing sub-system executes reprogrammable software 38 that performs image processing for visualization, analysis, or storage. The processor 36 may be either dedicated hardware or general purpose central processing unit (CPU), graphics processing unit (GPU) or digital signal processor (DSP) or a combination thereof.

The reprogrammable software 38 can use a touchscreen oriented user interface, run on an industry-standard notebook computer or workstation x86 PC platforms, and use built-in communication and display ports or additional modules can be added into the notebook computer or workstation for additional frame grabbing, processing, storage or display output functions.

The reprogrammable software 38 can perform various image processing functions including, without limitation, image correction, interpolation, white balance, color correction, color transformation including the use of three dimensional look-up tables, motion detection, object detection and classification, tracking, triangulation, calibration, color keying, image mixing, stereographic processing, anaglyph generation, indicator overlay, focus detection, exposure metering, zooming and scaling, flipping, data packing, pattern matching and recognition, face recognition, data rate analysis, enhancement, stabilization and compression. The image processing functions may be software selectable and may be combined for multiple image processing functions.

The image data can be stored, displayed, or transmitted. The processor 36 generates a file management system for subsequent data storage. The system 20 also includes a display 40 connected to the processor 36. The display 40 can come in the form of various devices including, without limitation, electronic viewfinders, cathode ray tube (CRT) monitors, liquid crystal displays (LCD), organic light emitting diodes (OLED), LCOS displays or projectors, or-stereographic displays, such as virtual reality (VR) goggles. The display 40 may be on-board the camera or remotely connected. The processor 36 generates a low latency representation of the scene 26 to the display 40 for user feedback and interactive control or positioning. In the event the processing sub-system 34 is not capable of displaying full resolution, full frame representations, the processor 36 can send a reduced resolution or reduced frame rate to the display 40 in order to maintain the low latency.

The processor 36 generates one or more outputs for display with image data, status and setting information or on-screen menus that are usable for a touch-screen user interface. The output can also be set to display image data with or without image processing in a full screen display mode without the status or operator control information, for projection or broadcasting. In this mode, it may still be possible to mix additional imagery, graphics and overlays for use in the transmission or recording. These features may include sports image annotation, advertisement insertion, animations, keying, virtual set integration or multi-channel streaming content mixing. In multiple display output configuration, one monitor or display 40 may be used for user interface and additional outputs used for full screen display with different image processing functions applied to the user images.

The processor 36 can output raw image data, image processed data or metadata in any combination for storage, transmission or display. The processor 36 can also generate outputs and external controls such as lighting controls, cooling system control, power management, motor positioning, lens controls, time code, device synchronization, multi-camera synchronization, calibration stimulus, tactile feedback, status indicators and audio.

The processor 36 monitors the temperature and recording status of the processing sub-system 34 and can automatically adjust a cooling system (not shown) that cools the processing sub-system 34. The cooling system can include a fan that dissipates heat. The processor 36 adjusts the cooling system in various ways including, without limitation, reducing fan speed, to lower the ambient noise levels generated by the camera system 20.

The processor 36 can accept input from a user (via a user interface) or the frame grabber 32 to perform specific tasks. Various input mechanisms 42 may include, without limitation, a computer mouse, a pointing device, a touch screen input, direct digital signaling or network commands. The specific tasks may include, without limitation, start or stop recording, initiate playback, adjust the settings of the frame grabber 32 and/or the image sensor 30, or select image processing or display modes.

The system 20 also includes a storage device 44. The storage device 44 can be either internal or external and either fixed or removable. Examples of various storage devices that may be used include, without limitation, non-volatile memory, flash memory, a magnetic hard drive, an optical disk and tape. For the purposes of external storage, display or processing, the processed or raw data may be externally transmitted. The transmission methods may include, without limitation, USB, Firewire/IEEE1394, SATA, Ethernet, PCI, PCI Express, Camera link, HDMI, DVI, HD-SDI, Displaylink, Infiniband, Wireless or Fiber optic link.

A particular configuration of a digital camera system 20 that uses multiple image sensor units 30 (via one or more modular camera units 28) input into a single processing sub-system 34 may be used for capturing multiple image simultaneously with the ability to synchronize the sources (i.e., sensor imaging units or camera modules), coordinate control and combine image processing, recording, display, storage and communication. This multiple camera configuration can be used for processing 30 stereographic and immersive scenes. The imagery (i.e., the RAW image data) and metadata (e.g., audio, positioning, timecode, etc.) from this multiple camera configuration can be recorded on a single removable storage medium or to independent storage devices in a synchronized fashion to enable simpler post-processing and display. The combined imagery can be outputted to specialized displays such as stereographic LCD monitors, 3D or spherical projection systems and VR goggles.

The system 20 includes software 38 stored on a memory and running on the processor 36. The software 38 provides the user with the ability to obtain stereo imaging. An imaging software program 38 provides control of single and stereo image sources (i.e., imagery) with synchronized image capture, frame grabbing, processing, metadata capture, display, coding, recording and playback, using a single user interface. The image sources (i.e., imagery) can be from image sensor units 30 or camera modules 28 capable of capturing high definition raw images at film or video rates for HD, 2K and 4K cinema quality production. As discussed above, the image sensor unit 30 may be based on at least one CMOS, CCD or other pixilated detection device that contains a time base and controller with precision to enable audio synchronization. The system 20 can record the sound or the timecode for the audio can be synchronized with the timecode for the images. A user can record the audio with the imagery or the timecode which is associated with the audio in another audio recording device which also records timecode and then tied back together during editing or post production process.

The software 38 running on the processor 36 may automatically detect the presence of an image sensing unit 30 or a camera module connected to a Network or to a hardware frame-grabber 32 to determine the camera module 28 or sensor unit identification and its image capture or processing capability. Upon identification, the software 38 can load image calibration data from a storage device 44 or can initiate a calibration process, which can extract data from the connected camera module(s) 28 including, without limitation, pixel-by-pixel black level, gains, shading, and defect pixels.

The software 38 running on the processor 36 adjusts settings of the camera module 28 and/or image sensor 30. The software 38 adjusts various settings including, without limitation, resolution, frame rate, exposure, gains and stereo sync source master or slave. The software 38 can program a camera module 28 or an image sensor unit 30 as a master that uses an internal sync and outputs the sync signals or as slave that receives a sync signal from external sources (e.g., another camera module 28 or image sensor unit 30 acting as a master). The software 38 can be used to set operation of the image sensor unit 30 in a continuous or skip frame output mode and to instruct the frame grabber 32 to capture the intermittent or alternating frames, with specific timing relative to the top of frame readout.

The software 38 running on the processor 36 can be used for controlling camera and optical positioning devices on a 30 stereo rig for stereo effect adjustment such as focus, iris, inter-ocular distance and convergence. The software 38 running on the processor 36 may also control a positioning system on which the 30 rig is mounted. The software 38 running on the processor 36 can capture metadata such as rig motor position data, timecode, lens and optics settings and camera settings.

The software 38 running on the processor 36 can perform image and stereo processing functions in any combination of general purpose processor or dedicated hardware, RISC arrays or DSP's. The image and stereo functions may include, without limitation, image correction, interpolation, white balance, color correction, color transformation including the use of three dimensional look-up tables, motion detection, object detection and classification, tracking, triangulation, calibration, color keying, image mixing, stereographic processing, indicator overlay, focus detection, exposure metering, zooming, scaling, warping, flipping, data packing, pattern matching and recognition, face recognition, data rate analysis, enhancement, stabilization and compression. The image processing functions may be software selectable and may be combined for multiple image processing functions.

The software 38 running on the processor 36 can perform compression and can employ a full-frame temporal Wavelet transform codec to eliminate "block artifacts" that are often present when using DCT compression. The software 38 may have scalable precision to operate on data-from 10-bit and higher, with optimized arithmetic precision based on source resolution, and scalable resolution to support a variety of formats including HD, 2K and 4K. The software 38 can use constant-quality, variable bitrate (VBR) compression that allows compression rates to rise dynamically for more complex scenes, and allows compression rates to dynamically fall for less-complex scenes. The codec can support Raw pixel data, RGB or YUV data formats. The codec can combine data from image, audio and metadata and streaming metadata in headers of files and within groups of pictures (GOP) for use in decoding and editing. The coded data can be encapsulated into industry standard format file containers such Audio-video Interleaves (AVI), Quicktime (MOV). In playback, the codec, which may be on the same software platform or part of a post-production software program, can adaptively select to decode hierarchical resolution data, inherent in the wavelet transform, to enable real-time, multi-stream editing performance in software on standard PCs, without the need for specialized hardware. The compression or coding method may be software selectable for each recording and streaming function. The software 38 can also capture and record imagery as uncompressed data at various bit depths.

The software 38 running on the processor 36 can code stereo streams as independent full-frame streams or can pre-combine the imagery into a single larger image or interleaved sequence for coding as a single stream. The metadata contained in the stream can be used to indicate the left and right image source and allow playback and editing of the stereo file as a single video source, yet displaying either source individually or as a mixed representation for stereographic display.

The software 38, either in a mobile stereo recorder of the type described below or on a separate playback system, can retrieve and render the recorded imagery into a sequence of raw images along with metadata as industry standard Digital Negative (DNG) files or as fully processed RGB or YUV images based on metadata stored within the image and data stream or in an associated container file, in formats such as DPX and TIF. The software 38 may allow modification to the associated metadata streams effects on the retrieved images. The method for debayer algorithm can be selectable or accomplished thru replacement of software modules.

The software 38 running on the processor 36 can generate processed display imagery from live or playback sources on single or dual outputs. The colorized raw or processed image data and metadata can be sent to a host (i.e., a separate computer which is not the mobile stereo recorder) for additional display, processing, recording or transmission. The software 38 can flip and mirror display imagery to enable a viewing system with two displays on a 3D beam splitter viewer. The display image data can be formatted and scaled for standard definition or high-definition displays 44. For bayer image sources, the software 38 can be used to select the demosaic method, based on the available processing capability. The processed imagery may include generating stereographic displays including dual-streams image mixing, anaglyph, over-under, side-by-side, sequential switching and other modes, which may assist in perceiving the potential 3D stereo.

The overlap or mix from the dual image streaming sources may be adjusted relative to each other to change the stereo effect. The repositioning and adjustment may include translation, rotation and warping. The resulting adjustment done thru the user interface becomes another metadata source, while allowing the full-size non-adjusted original data to be transmitted or recorded.

The software 38 running on the processor 36 can operate in a client-server configuration with remote control over a wired or wireless network. The software 38 can accept a trigger to initiate synchronized start and stop recording. Client software can request and receive data from a server on the network where the data comes in various forms including, without limitation, single images, stereo image, streaming images, audio, time code, camera settings, server settings, project settings, color look up tables and other metadata. The client software can send the same or modified versions of the data back into a camera system which also has the processing, such as the mobile stereo recorder, and effect changes on the live or recorded data.

The software 38 running on the processor 36 can execute a timed motion and recording event sequence, which may include, without limitation, start recording, continuous adjustment of stereo rig positioning and lens settings such as programmed slew rates, target positions and pauses, record speed changes and event and timer triggers.

The software 38 running on the processor 36 may have a mode for calibration of a display device 44. In the calibration mode, the software 38 can generate test pattern outputs for stimulus and the response values can be measured using a connected optical sensor. A sequence of stimulus and response measurement values can then be used to create a modification to the imagery sent to the display 44, such as using 3D Look-up-tables applied to the raw data or used to modify the settings on the hardware used to generate the output.

The software 38 running on the processor 36 can combine the stereo imagery in a virtual studio which takes a video image of live scene shot against a keying color background or stage and composite them against a computer-generated 3D environment to create the illusion that the live actors are actually inside and interacting within a virtual world. The software 38 can switch between multiple stereo sources, have selectable image and audio stream mixing or delaying, chromakeying, and renderer 3D Graphic real-time. The software 38 can provide trackless camera control where the camera's motion and switching between shots are accomplished by manipulating the 3D virtual set itself rather than by manipulating the real, physical cameras. Within the Virtual Studio, movements like complicated pans, swoops, and tilts are then possible because the camera is not actually physically moving—the 3D set is. The software 38 can have a pre-defined track assigned by 3D design or manipulated through an external input device such as a joystick. The software 38 can make positional adjustments of the stereo rig (i.e., a physical package with two sensor units or camera modules) synchronized with changes in the virtual set further enhancing the stereo perception. The combined output of the stereo sources and virtual set can be displayed for live production and can be encoded for streaming and recording.

The software 38 running on the processor 36 can operate on independent hardware platforms for increase processing power, where capture, processing, switching and effects, such as virtual sets, streaming and recording can be distributed and controlled via network, yet can maintain synchronized recording events.

The software 38 running on the processor 36 records on a single removable storage medium or to independent storage devices in a synchronized fashion with common file naming conventions, to enable simpler stereo post processing, editing and playback.

Various components of the processing sub-system 34 of the system 20 can be embodied in a single housing that acts as a mobile stereo recorder 46. The mobile stereo recorder 46 executes the software 38 of the camera system 20 and can capture, process and record synchronized imagery from at least two image sensor units 30 or camera module source playback using a single user interface.

The recorder 46 includes a battery voltage input power supply with gigabit Ethernet for image and data communication. The streaming data can then be processed by a host computer, such as a single or multi-core x86 CPU with a graphics processing unit (GPU) for display and have interfaces for removable storage which may include IDE, USB, Network and SATA.

The mobile stereo recorder 46 may also use an additional multi-input frame grabber processing system. The frame grabber 32 may use FPGA devices and scalable massively parallel RISC Processor Arrays. The RISC array processor may use architecture of brics, which contain multiple compute units, such as Streaming RISC units and streaming RISC units with DSP extensions, and memory RAM units. The RAM Units can stream addresses and data over channels. These channels can be word-wide and run at 10 Gigabits per second or higher. These processors can execute an operation, do a loop iteration, input from channels, and output to a-channel every cycle. These brics can connect by abutment through channels that cross bric-to-bric. The compute units and ram unit can be arranged so that, in the array of brics, there are contiguous compute units and contiguous ram units. The array processor can have a configurable interconnect in hierarchical fashion with several levels of hierarchy.

The frame grabber processing system may be capable of capturing stereo image data from multiple high-speed serial digital transmission links, such as 1.5 Gigabit and 3.0 Gigabit HD-SDI, HSDL, Easylink and Cameralink. The image data may be from image sensor units 30 or camera modules 28 in raw pixel data, color processed RGB, color-processed YUV in coded or uncoded formats. The image data may also come from broadcast video or computer sources.

The frame grabber 32 can be capable of capturing 4K image data at a minimum of 4096×2180 from an image sensor unit 30 at a minimum 5 Gigabit/sec or from a 4K camera module 28 at a minimum of 2.55 Gbit/sec of raw data.

The frame grabber processing system may be capable of stereo display outputs. Each output may be capable of displaying live or processed imagery from the sensor units or camera modules. The stereographic outputs may include stereo visualization video processing and signaling to drive dual displays or displays requiring mixed streams, included synchronization data for shutter glasses controls.

The mobile stereo recorder system 46 can execute programmable code 28 for image and stereo processing functions. The processing functions can be done by the frame grabber processor alone or in combination with the host computer and graphics processor unit. Playback can be done on the host or in combination with the frame grabber processing system, where the imagery can also be output for display. The processing and control functions of the mobile stereo recorder 46 may be remotely controlled from another system via wired or wireless network or other input device, such as touchscreen keypad with serial communication.

The mobile recorder 46 can use a single removable storage magazine 44, which may contain at least one storage media unit. The removable storage magazine may use at least one SATA interface. The storage device 44 may include a Raid controller, with drive carrier selecting the RAID storage methods, such as RAID-0 or RAID-1.

The mobile recorder 46 can be contained in an ergonomic package which enables it to mount on a stereo camera stabilizing platform, such as a steadicam and MK-V Revolution System, along with stereo image sensor units 30 or camera modules 28, which mechanically isolates the movement of the camera rig (i.e., the platform which has the sensor unit(s) or-camera modules or camera with recording system) from that of the camera operator, providing a very smooth shot even when the operator is moving quickly over an uneven surface.

Figure 2:
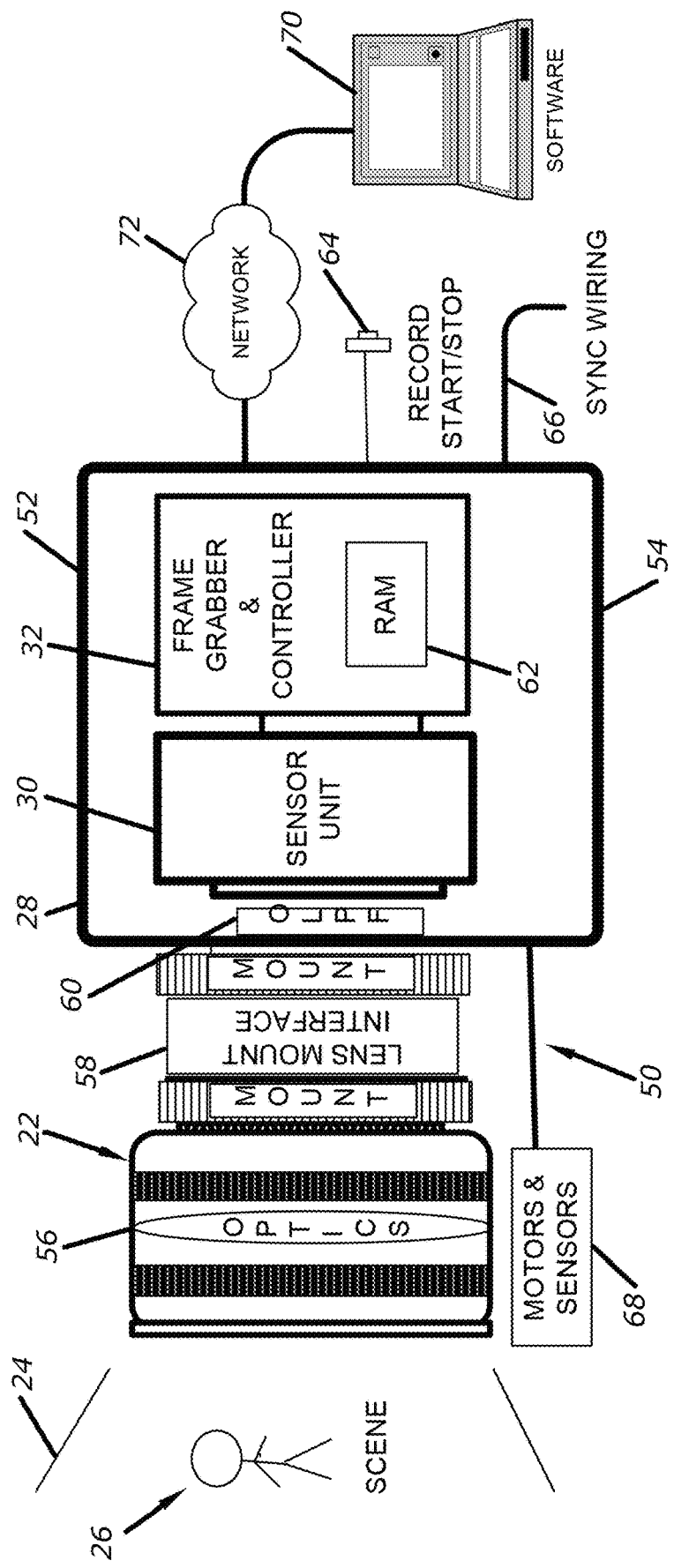
FIG. 2 is a diagram of an embodiment of the digital camera system.

In another embodiment of the present invention, as seen in FIG. 2, a digital camera system 50 includes an optical assembly 22 to gather light 24 from a desired scene 26. The system 50 also includes a modular imaging subsystem 28 aligned with the optical assembly 22 to receive light 24 gathered and/or modified by the optical assembly 22. The modular imaging subsystem 28 comprises at least one imager sensing unit or imager 30 and at least one frame grabber 32. The modular imaging subsystem and the frame grabber are in a shared housing 52 and comprise, in part, a camera module 54.

The optical assembly 22 includes optics 56 (e.g., a Carl Zeiss Super 16 Ultra Prime lens) connected to the camera module 54 at an appropriate back focal distance using an interchangeable lens optical interface mounting assembly 58 that includes an optical low pass filter (OLPF) 60 (e.g., a P+S Technik PL lens Interchange mount with Sunex Optical Low pass filter). Alternatively, the mount may be a P+S IMS Interchange Mount with calibrated back focus and sensor co-planarity adjustment mechanism. The interchangeable lens optical interface mounting assembly 58 is a precise mounting surface and locking mechanism, which enables field exchange of the lens mount to support the use of a variety of industry standard lenses such as, PL, Nikon-F, Panavision, Leica, C and Canon.

The modular imaging sub-system 28 comprises an HD/2K or 4K CMOS image sensor unit 30 and a frame grabber and controller 32. One example of an image sensor unit 30 is an Altasens 4562 2K and HD CMOS system-on-chip, Xilinx FPGA, Microchip PIC micro controller, Linear LT series Linear regulators, IDT ICS-307 programmable clock and Fox 924 temperature controlled crystal oscillator. Another example of an image sensor unit 30 is an Altasens 8472 Quad HD and 4K format capable sensor. An example of a frame grabber and controller 32 is a Pleora iPort with FPGA, RAM Buffer and Gigabit Ethernet connectivity with serial ports and GPIO for programmable device control and communication. An example of a camera module 54 comprising an integrated imaging sub-system 28 in a housing 52 is an SI-2K MINI digital camera from Silicon Imaging, Inc. The SI-2K MINI includes an Altasens 4562 CMOS imaging sensor unit and a Pleora frame grabber. The SI-2K MINI is capable of capturing 2K (2048×1152), 1080P HD (1920×1080), 720P (1280×720) AND 540p (960×540) resolution motion pictures. The SI-2K MINI can operate at various film and video rates including 23.97, 24, 25, 29.97, 30, 50, 59.9 and 60 frames per second. The SI-2K MINI has local RAM buffer 62 to capture images at higher rate than the channel capacity and can buffer frames and transmit on a skip frame basis Minimum Resolution for 2K is 2048×1080 and-minimum film rates would be 23.976, except for special time lapse shoot. For 4K shooting, a minimum resolution is 4096×1714. A film rate is approximately 23.976 frames per second (i.e., 24 frames per second) and video rate is 25-30 frames per second.

Channel bandwidth between image sensing unit and frame grabber and between frame grabber and processor is sufficient for transmission to enable full resolution motion picture raw image or data processing. This means the pipe to move the data from the sensor to the frame grabber must be fast or wide enough to carry all the raw pixel data as it is reading out of the sensor at the film and video rates. For example, to move 2K image, which has 3.3 MB per frame at 48 frames per second would require almost 200 MB/sec throughput from the sensor to the frame grabber. Often, readout from the sensor is at 2× the speed than needed to capture in the frame grabber 32. The frame grabber 32 then only needs to move 24FPS or 100 MB/sec to the PC for processing. It is reasonable to have the frame grabber 32 do lossless coding of the data to achieve a 2:1 data reduction, which would get the frame grabber to host link bandwidth at 50 MB (hence a minimum of 48 MHz as Intel 4).

The system 50 includes a record start/stop button 64 (e.g., a momentary mechanical switch) electro-mechanically connected to the camera module 54 along with power and sync input and output wiring 66 using a connector (e.g., an 8-Pin Lemo FGG.1B.308.CLAD52 connector). An output signal is a light emitting diode (LED) (not shown) electro-mechanically connected to the iPort GPIO that illuminates when recording is active and un-illuminated when recording is non-active.

The system 50 further includes a plurality of motors and sensors 68 (e.g., a C-motion lens control system, a Preston Motor and control system, etc.) that act as adjustment mechanisms to adjust the position of the image sensor unit relative to the optical center of the lens projected image circle and/or to adjust the co-planarity of the sensing plate upon which the image sensor pixel circuit board rests relative to the optical interface mounting assembly 58. The sensor is mounted behind the lens and can be adjusted for flatness, centering and rotation. Any of the adjustment mechanisms can include an electronic positioning device for remote operation.

The system 50 further includes a laptop notebook computer 70 connected to the camera module 54 by a cable (not shown) (e.g., a CAT-5e Ethernet cable) through a Network 72. The cable is connected to the camera module 54 by a connector (e.g., a 12-pin LEMO FGG.2B.312.CLAD52 Connector). One example of the notebook computer 70 is a Dell M90 with a Marvell Yukon Gigabit Ethernet Expresscard for camera connectivity. On-board wired and wireless Ethernet ports of the notebook computer provide remote connections streaming, internet connectivity and control.

Figure 3:
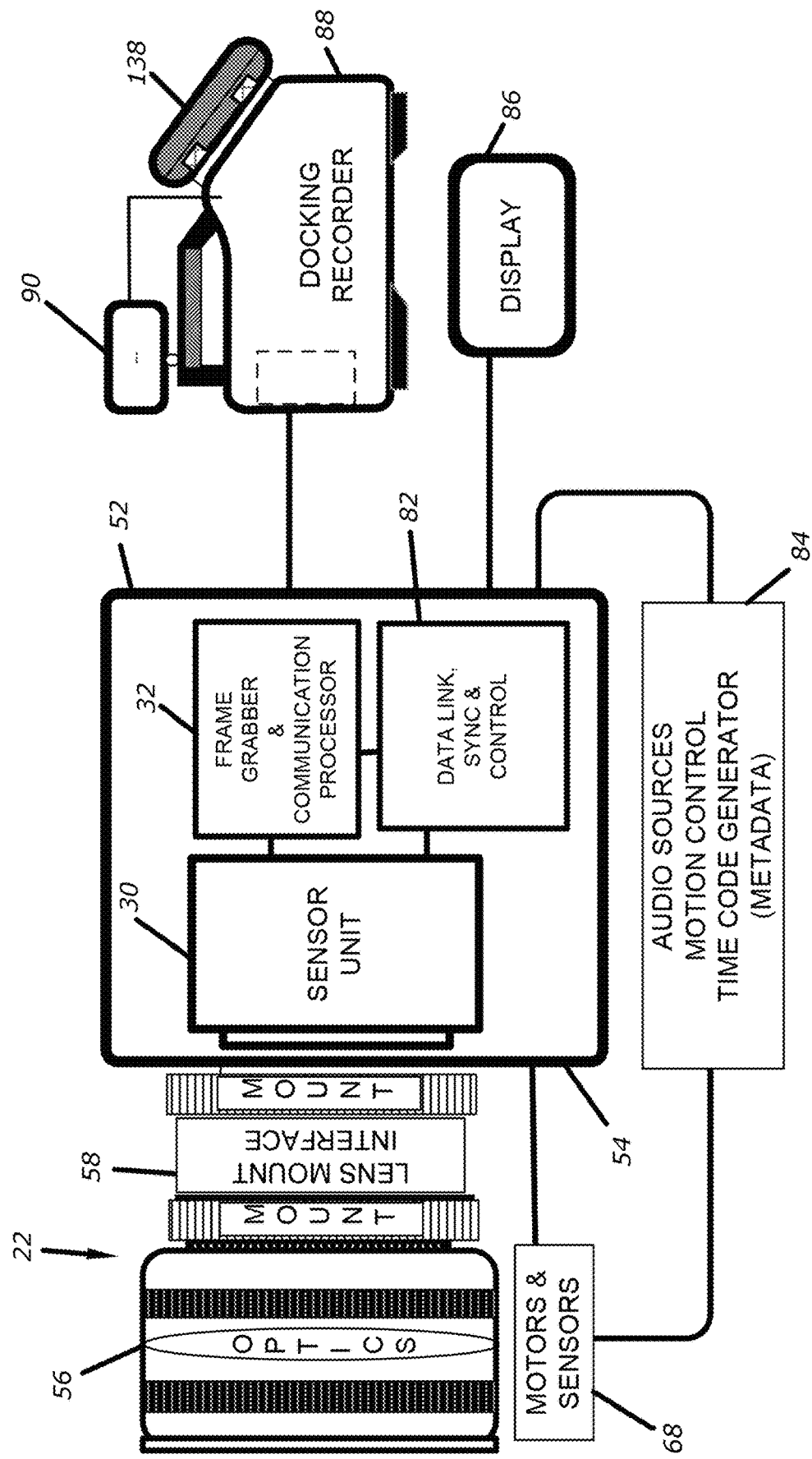
FIG. 3 is a diagram of an alternate embodiment of the digital camera system.

A further embodiment of the present invention is illustrated FIG. 3, where a digital camera system 80, similar to the digital camera system 50 described above, includes a camera module 54, as described above in relation to FIG. 2, that has an additional capability for the frame grabber 32 to process raw video into a live video output. The additional frame grabber processing section comprises a data link, sync and control unit 82 (e.g., an Altera FPGA with Lux Media Plan HD-1100 raw color processing core, dedicated clock reference for 74.25 and 74.1758 MHz, Gennum GS Series Serializers and cable drivers for 1.5 or 3 Gbit/sec HD-SDI, IDT Dual Port FIFO for external time base synchronization or retiming, SSRAM, Flash and Analog Devices RAMDACs for SVGA Output) connected to the sensor imaging unit 30 and the frame grabber 32. The processing core of the frame grabber 32 can convert raw pixel data into RGB data using demosaic, image correction and color conversion. The processing core can also convert between RGB and YUV spaces and output either 4:4:4 or 4:2:2 data. The same data link which carries the color processed data from the frame grabber 32 to the viewing and recording system can also be used to transmit the raw data.

The system 80 further includes an input unit 84 electro-mechanically connected to the camera module 54 and a plurality of motors and sensors 68 that are also electro-mechanically connected to the camera module 54. The input unit 84 includes audio sources, motion control and a time code generator. An Audio codec (not shown) with preamps can receive line or microphone level audio input to mix into the data stream. The time code generator can be an Ambient ALL-601. The plurality of motors and sensors 68 are used, in part, to control the lens (e.g., a C-motion lens control system) act as adjustment mechanisms to adjust the position of the image sensor unit 30 relative to the optical center of the lens mount and/or to adjust the co-planarity of the sensing plate (i.e., the surface or circuit board which holds the image sensor in the correct position) relative to the optical interface mounting assembly 58.

The system 80 also includes a display 86 (e.g., a Cine-Tal CineMage LCD Monitor, a Lite-Eye LE-450 OLED viewfinder or the like) for viewing image data output from the camera module 54. Image, metadata and controls touch-screen user interface can also be shown on this display.

The system 80 additionally includes a docking recorder 88. One commercial available example of a docking recorder is a SI-2K available from Silicon Imaging, Inc., running SiliconDVR software, with remote camera module 54 (e.g., an SI-2K MINI) with Live Video output processing. The docking recorder 88 includes USB ports to connect the docking recorder 88 with a number of photometric measuring devices (e.g., a colorimeter which measures intensity at different light wavelengths) which can is placed on a display 90 of the docking recorder 88 to create calibration profiles. The calibration profiles serve to get accurate settings independent of monitor adjustments (e.g., the user may have turned a color hue knob on the monitor) such that orange will be orange and not orange-red. The camera module 54 can be electro-mechanically docked with the docking recorder 88.

Figure 4:
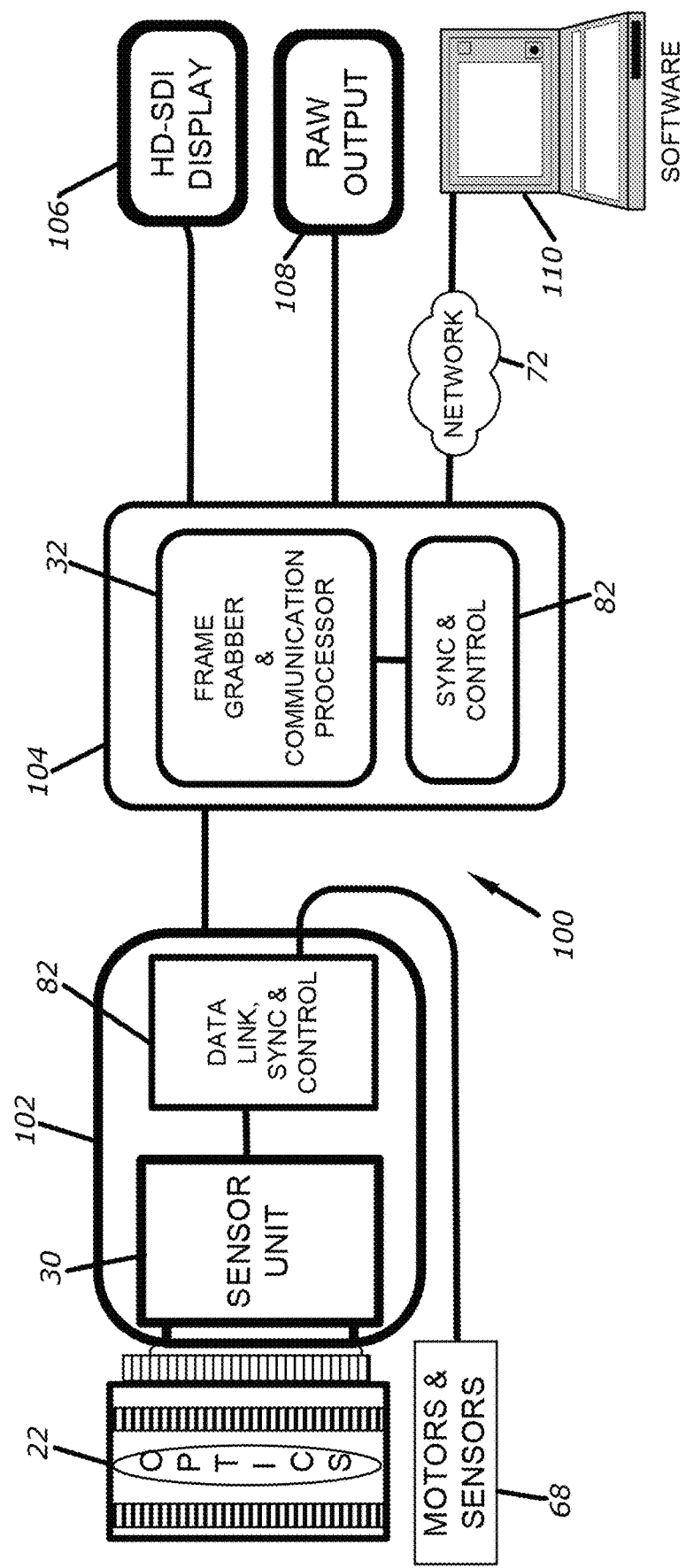
FIG. 4 is a diagram of an additional embodiment of the digital camera system covering a remote sensor and frame grabber camera module.

An additional embodiment of the present invention is illustrated FIG. 4, where a digital camera system 100, similar to the digital camera systems 50 and 80 described above, includes a camera head module 102 comprising an optical assembly 22, an image sensor unit 30 and a data link, sync and control unit 82 that is located remotely from a frame grabber unit 104 comprising a frame grabber unit 32 and a sync and control unit 82.

The remote camera head module 102 uses an HD/2K or 4K CMOS image sensor unit 30 (e.g., an Altasens 4562 2K and HD CMOS system-on-chip, an Altasens 8472 Quad HD and 4K format capable sensor), a Xilinx CPLD for sync and sensor timing control, a Microchip PIC micro controller, Linear LT series Linear regulators, an IDT ICS-307 programmable clock and a Fox 924 temperature controlled crystal oscillator. The camera head module 102 also includes a National Channelink LVDS 28:4 DS90 serialization and National LVDS receiver and driver for serial communication and trigger input and output. The optical assembly 22 includes a lens mount comprising a back focus adjustable c-mount (e.g., a P+S IMS Interchange Mount with calibrated back focus and sensor co-planarity adjustment mechanism) and an optic (e.g., a Linos MeVis c-mount lens, a P+S interchange B4 optical mount and Zeiss Digiprime Lens or the like).

This remote camera head module 102 is commercially available as either a SI-2K MICRO-CL or SI-1920HD-CL with 4562 sensor from Silicon Imaging, Inc. An alternate link configuration uses an National EasyLink DS32ELX0421 for transmission over CAT5e and Coax and triax. Another link configuration uses FPGA with built-in serializer logic and either National or Gennum cable drivers. A further link configuration uses a triax cable to transmit image and associated data, receive control data via demodulation, and receive power. If power is applied locally to the image sensor unit 30, a coax cable can then operate on coax.

An Altera FPGA Serializes the sensor data output (i.e., the data from the sensor or from the analog digital converter which samples the pixel photosite) and uses at least one Easylink or cable driver for the data link One configuration uses a Cat-5 with up to 3 pairs for transmitting the serialized data to and from the sensor unit and one pair for power. The frame grabber 32 and processing unit (i.e., the processing unit which can perform video processing for display) are described above with respect to the SI-2K MINI with Video processing where the image sensor unit 30 is remotely connected. One connection output from the frame grabber unit 104 drives an HD-SDI display 106 while another connection output from the frame grabber unit 104 outputs raw pixel data 108, either coded or uncoded.

The camera head module 102 is connected via a network 72 for remote control and setup. The camera head module 102 can also be connected to a MacbookPro notebook computer 110 running bootcamp and WindowsXP. Silicon Imaging SiliconDVR software is used for camera control, processing, display and recording. Alternatively, the camera head module 102 can be connected to an SI-2K docking recorder 88 running SiliconDVR software.

The system 100 further includes a plurality of motors and sensors 68 that are also electro-mechanically connected to the camera head module 102. The plurality of motors and sensors 68 are used, in part, to control the lens (e.g., a C-motion lens control system) act as adjustment mechanisms to adjust the position of the image sensor unit 30 relative to the optical center and/or to adjust the co-planarity of the sensing plate relative to the optical assembly 22.

Figure 5:
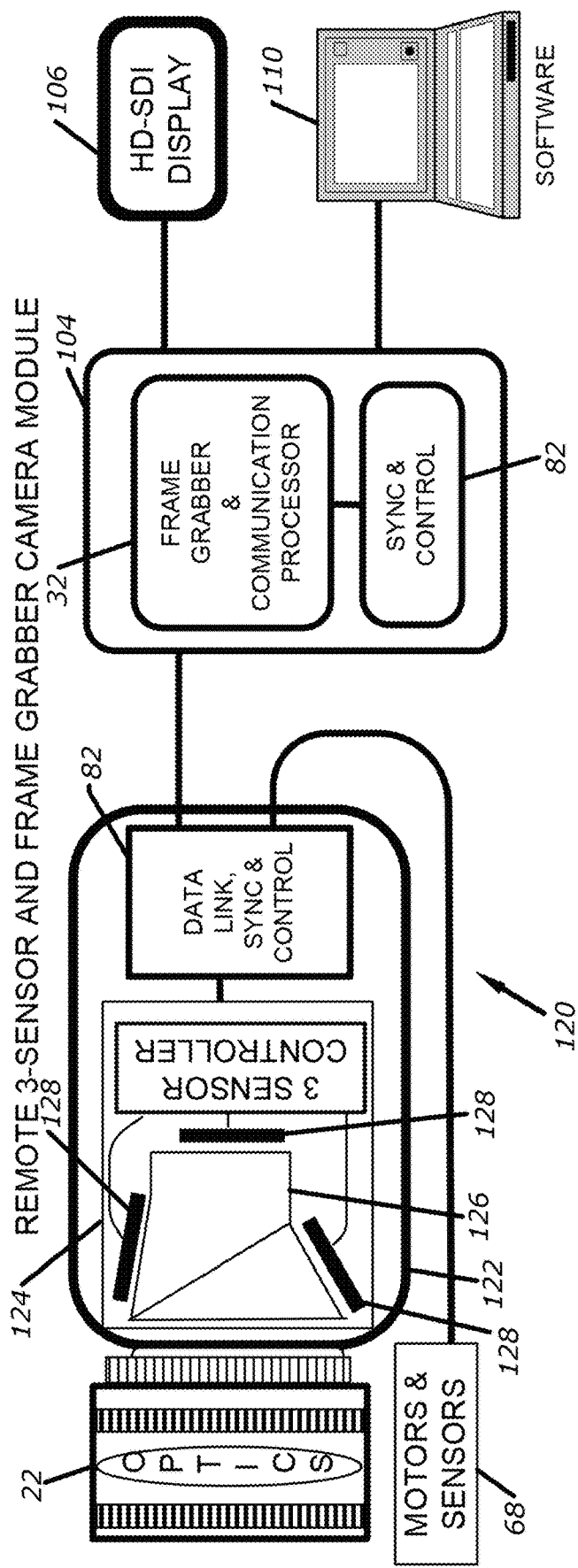
FIG. 5 is a diagram of another embodiment of the digital camera system covering a remote three-sensor and frame grabber camera module.

An embodiment of the present invention is illustrated FIG. 5, where a digital camera system 120, similar to the digital camera systems 50, 80 and 100 described above, includes a camera head module 122, similar the camera modules 54 and 102 described above, comprising an optical assembly 22, at least one pixilated multi-sensor image sensor unit 124 and a data link, sync and control unit 82 that is located remotely from a frame grabber unit 104 comprising a frame grabber unit 32 and a sync and control unit 82.

The remote camera head module 122 further comprises an optic 126 (e.g., a beam splitter) to split light 24 in multiple directions. For example, one particular configuration of the camera head module 122 comprises two sensors 128 (each sensor 128 having an array of pixels) and a beam splitter 126 for stereo 3D or wide dynamic image capture. Each sensor 128 can comprise either a monochromatic pixel array or a color-filtered pixel array. Each of the sensors 128 can be controlled and moved mechanically or, alternatively, each of the sensors 128 can be electronically windowed to move the readout region of the particular sensor 128. One of the two sensors 128 can be replaced with an optical viewfinder port, allowing simultaneous thru-the-lens focusing and digital capture. In an alternate configuration, the camera head module 122 comprises an RGB prism 126 and three monochromatic sensors 128 (as seen in FIG. 5), one for each color channel. Additional prism ports are added to achieve additional targeted wavelength or full spectrum illumination range capture. One connection output from the frame grabber unit 104 drives an HD-SDI display 106.

The camera head module 122 is connected for remote control and setup. The camera head module 122 can also be connected to a MacbookPro notebook computer 100 running bootcamp and WindowsXP. Silicon Imaging SiliconDVR software is used for camera control, processing, display and recording. Alternatively, the camera head module 122 can be connected to an SI-2K docking recorder 88 running SiliconDVR software.

The system 120 further includes a plurality of motors and sensors 68 that are also electro-mechanically connected to the camera head module 102. The plurality of motors and sensors 68 are used, in part, to control the lens (e.g., a C-motion lens control system) act as adjustment mechanisms to adjust the position of the image sensor unit 124 relative to the optical center and/or to adjust the co-planarity of the sensing plate relative to the optical assembly 22.

Figure 6:
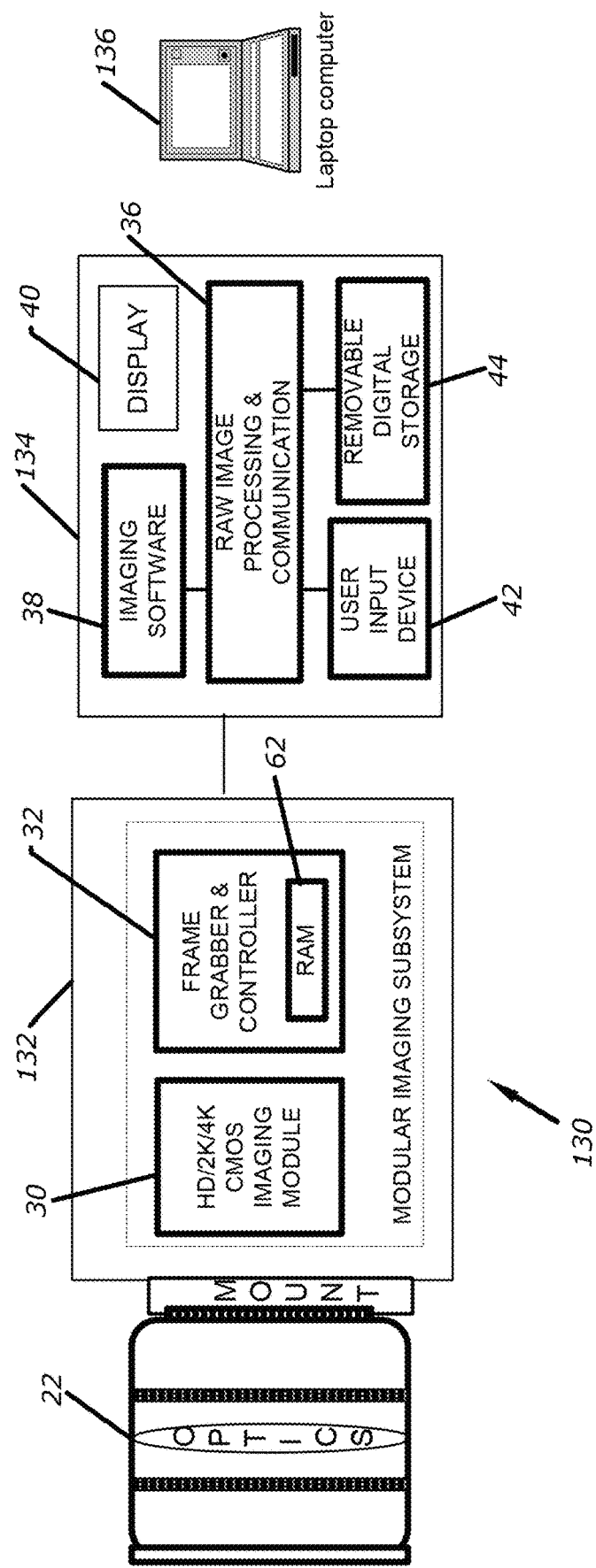
FIG. 6 is a diagram of yet another embodiment of the digital camera system.

FIG. 6 illustrates an additional embodiment of the present invention, where a digital camera system 130, similar to the digital camera systems 50, 80, 100 and 120 described above, includes an optical assembly 22, a camera head module 132, similar the camera modules 54, 102 and 122 described above, connected to the optical assembly 22. The camera head module 132 is remotely located from a processing, storage and display system 134. The camera head module 132 can be in the form of an SI-2K MINI, as described in detail above and shown in FIG. 2, where the image sensing unit 30 comprises a Kodak 2k×2k CCD and the processing, storage and display system 134 comprises a Dell Precision Workstation with Intel Core 2 Duo processor, Intel Pro/1000 Gigabit Multiple Port Network Interface card, Nvidia Quadro Graphics GPU, CRU Removable DP-25 SATA Cartridge system and LCD display with 1920×1200 native resolution. The camera head module 132 (i.e., SI-2K MINI) is powered by a 12 VDC supply or Li-ion battery, such as an Anton Bauer Dionic 90 and is connected to the processing, storage and display system 134 using Gigabit Ethernet over CAT5e or thru Cisco fiber optic links and routers. The 12-bit raw imagery and metadata is transmitted between the camera head module 132 (i.e., the SI-2K MINI) and the processing, storage and display system 134 (i.e., the Dell Precision Workstation) at minimum sustained data rates of 80 MB/sec for 2K DCI 2048×1 080 capture, control, visualization, recording and communication. A laptop notebook computer 136 (e.g., a Dell M90) is connected to the processing, storage and display system 134 (i.e., the Dell Precision Workstation) via wired or wireless network for remote control, viewing, playback and metadata management.

Figure 7:
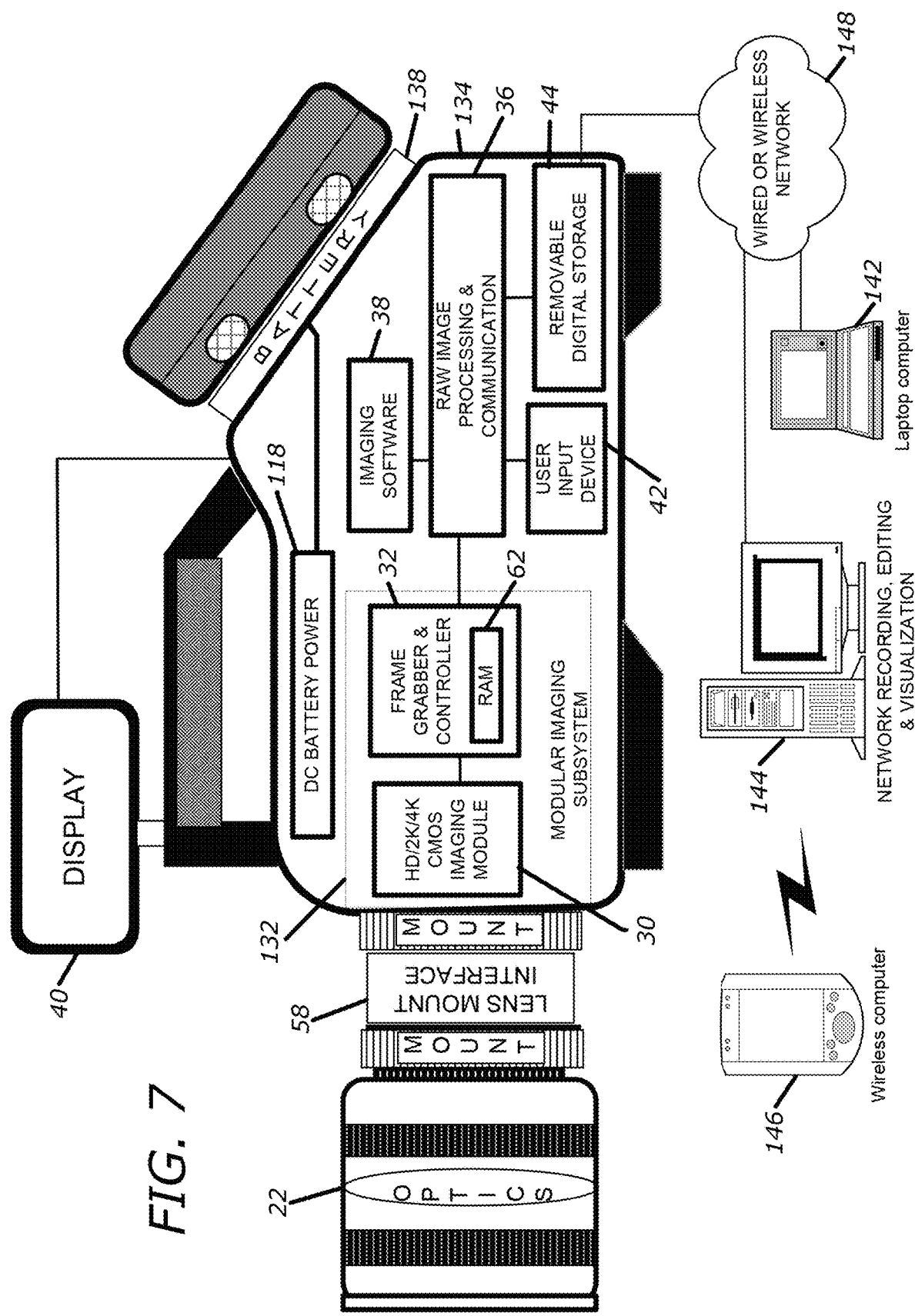
FIG. 7 is a diagram of an alternate embodiment of the digital camera system.

As seen in FIG. 7, another embodiment of the present invention illustrates a digital camera system 140, similar to the digital camera systems 50, 80, 100, 120 and 130 described above, showing a modular imaging sub-system 28 that comprises, in part, a camera head module 132 that is docked with a processing, storage and display system 134. The camera head module 132 is commercially available as the SI-2K MINI, as described above in other embodiments. The processing, storage and display system 134 includes a raw image processing and communication unit 36 (e.g., a computer based on an Intel Core 2 Duo T7600 2.33 GHz multi-core processor with dual channel DDR2 667 MHz RAM, Intel PRO/1000 Gigabit Ethernet and Intel GMA950 Integrated GPU with dual HD video outputs, such as the MEN F17 Modular Compact PCI system). The processing, storage and display system 134 also includes a user input device 42 (e.g., an Interlink Micromodule mouse pointing module) connected via USB to the processor 36. The processing, storage and display system 134 also includes another user input device 42 in the form of a Soundevice USBPre for audio input. The processing, storage and display system 134 further includes a battery 138 (e.g., an Anton Bauer Hytron 140 Lithium Ion connected via the Anton Bauer Gold Mount plate or external 4-pin Neutrik XLR) and a DC battery input power supply 118 (e.g., an Opus Solutions DCA7.150 150 W DC-DC converter) which delivers regulated 12 VDC power for peripherals and 5 VDC to power the processing and communication subsystem 134.

The processing and communication subsystem 134 further includes a display device 40 (e.g., a Xenarc 700TSV LCD Monitor with touchscreen (where the touch screen also provides an additional user input via a USB interface) or Kopin Cyberdisplay with DVI interface are display devices.

The imaging software 38 used in the processing and communication subsystem 134 is the Silicon Imaging SiliconDVR program running under Microsoft Windows XP. Other software tools used by the SiliconDVR for image processing include Microsoft Direct-X graphics, CineFormRAW Codec and Iridas Speedgrade 3D look-up-table software.

The processing and communication subsystem 134 additionally includes removable digital storage 44 (e.g., a CRU DP-25 SATA RAID Frame, Kingwin KF-25 mobile rack with Seagate 2.5" Hard drive, Crucial Flash device, or 32 GB Intel SLC Solid State Drive SSD Device with 150 MB/sec write speed). The system 140 includes a laptop computer 142 (e.g., a Dell Precision M90) and a Network recording, editing and visualization system 144 (e.g., a Dell Precision 390 workstation) and a wireless computer 146 (e.g., a motion computing LE1700). The laptop computer 142 and the Network recording, editing and visualization system 144 are each connected to the removable digital storage 44 of the processing and communication subsystem 134 via a wired or wireless network 148. The wireless computer 146 operates over a 802.11 wireless network which is using D-link wired or wireless routers or USB wireless networking devices to connect to the other components of the system 140.

Figure 8:
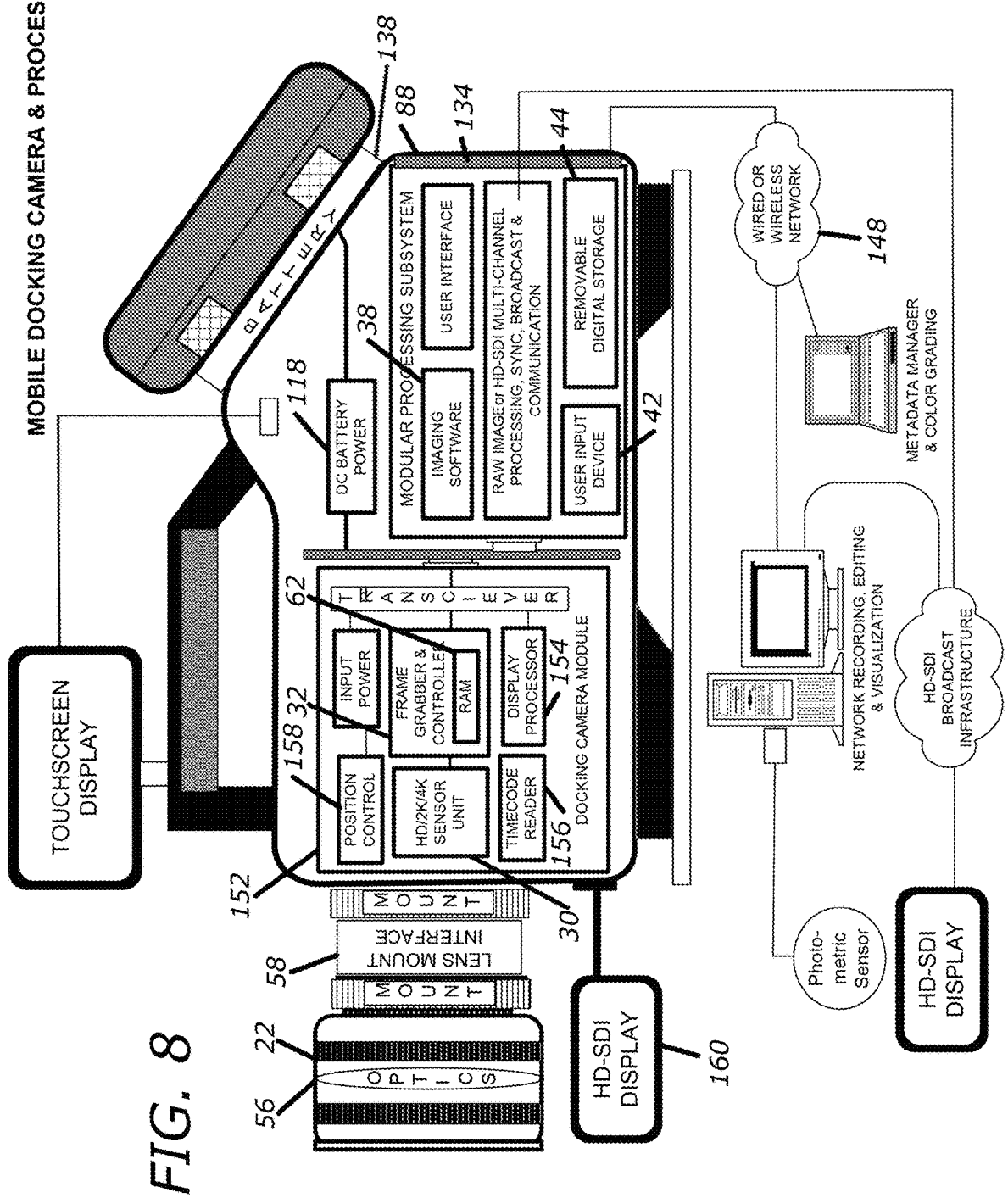
FIG. 8 is a diagram of another embodiment of the digital camera system a mobile docking camera and processing system.

An additional embodiment of the present invention is illustrated FIG. 8, where a digital camera system 150, similar to the digital camera systems 50, 80, 100, 120, 130 and 140 described above, comprises an image sensor and frame grabber camera module 152, similar the camera modules 54, 102, 122 and 132 described above, including a display processor 154, embedded time-code reader 156 and motion control 158, where the camera module 152 is docked with the modular processing, storage and display system 134. The system 150 includes an optical assembly 22. The camera modules includes a CMOS image sensor unit 30 (e.g., an Altasens 4562 HD/2K sensor or 8472 Quad HD and 4K format capable sensor). An Altera FPGA serializes the sensor data output and uses at least one Easylink or cable driver for a data link One configuration uses three or more pair for transmitting the 4K serialized data to and from the image sensor unit 30 and one pair for power. The camera module 152 is connected to the docking recorder 88 by a connector (e.g., a 12-pin LEMO FGG.2B.312.CLAD52 Connector). An Additional LEMO connector is docked.

The optical assembly 22 includes optics 56 (e.g., a P+S interchange B4 optical mount and Zeiss Digiprime Lens) and a lens mount (e.g., a P+S IMS Interchange Mount with calibrated back focus and sensor co-planarity adjustment mechanism).

The modular processing sub-system 134 comprises a computer based on an Intel Core 2 Duo T7600 2.33 GHz multi-core processor with dual channel DDR2 667 MHz RAM, Intel PRO/1000 Gigabit Ethernet and Intel GMA950 Integrated GPU with dual HD video outputs, such as the MEN F17 Modular Compact PCI system. The processing sub-system includes at least one user input device 42 (e.g., an Interlink Micromodule mouse pointing module connected) via USB to the processor 36.

A frame grabber processing unit 32 is connected to the MEN F17 Modular Compact PCI system using a PCIe bus interface daughter card, which contains Altera FPGA and at least one Ambric AM2045 scalable massively parallel RISC Processor Array, and DDR2 400 RAM with 4-lane PCIe interface. The serialized data from the camera module 152 is received thru National Easylink or HD-SDI receiver deserializers and then converted thru the FPGA to parallel data for input into the Ambric frame grabber, where it can then be processed and color corrected and compressed using a Wavelet Codec, such a Cineform or JPEG2000. The same receivers can alternately be used for multiple camera module input. The raw data or coded data can be accessed by the Intel Core 2 duo processor, where the processor can perform additional image processing, visualization output or recording. An additional Ambric processor can be used for video format conversion and re-timing for live display in HD-SDI or computer format. The processed video can also be sent back on a data pair back to the camera module 152 for displays 40 connected directly to the camera module 152 and where there is insufficient processing or space for performing the processing in the camera module itself. An alternate display section uses the Lux Media Plan Video processing core and memory buffers to produce scaled and retimed live video in SD, HD and 2K outputs. The processing section can support dual outputs for stereo display.

Additional computers connected to the system can be used to adjust and manage metadata which can adjust settings such as visualization modes, used for recording of image data streams or used for processing of streams into live outputs for display on local monitors or to live or playback broadcast feeds. The computers can also be used to capture photometric sensor data to adjust the display calibrations which can become part of the visualization image processing. A laptop notebook computer (e.g., a Dell M90) is connected to the processing, storage and display system 134 (i.e., the Dell Precision Workstation) via wired or wireless network for remote control, viewing, playback and metadata management.

Figure 9:
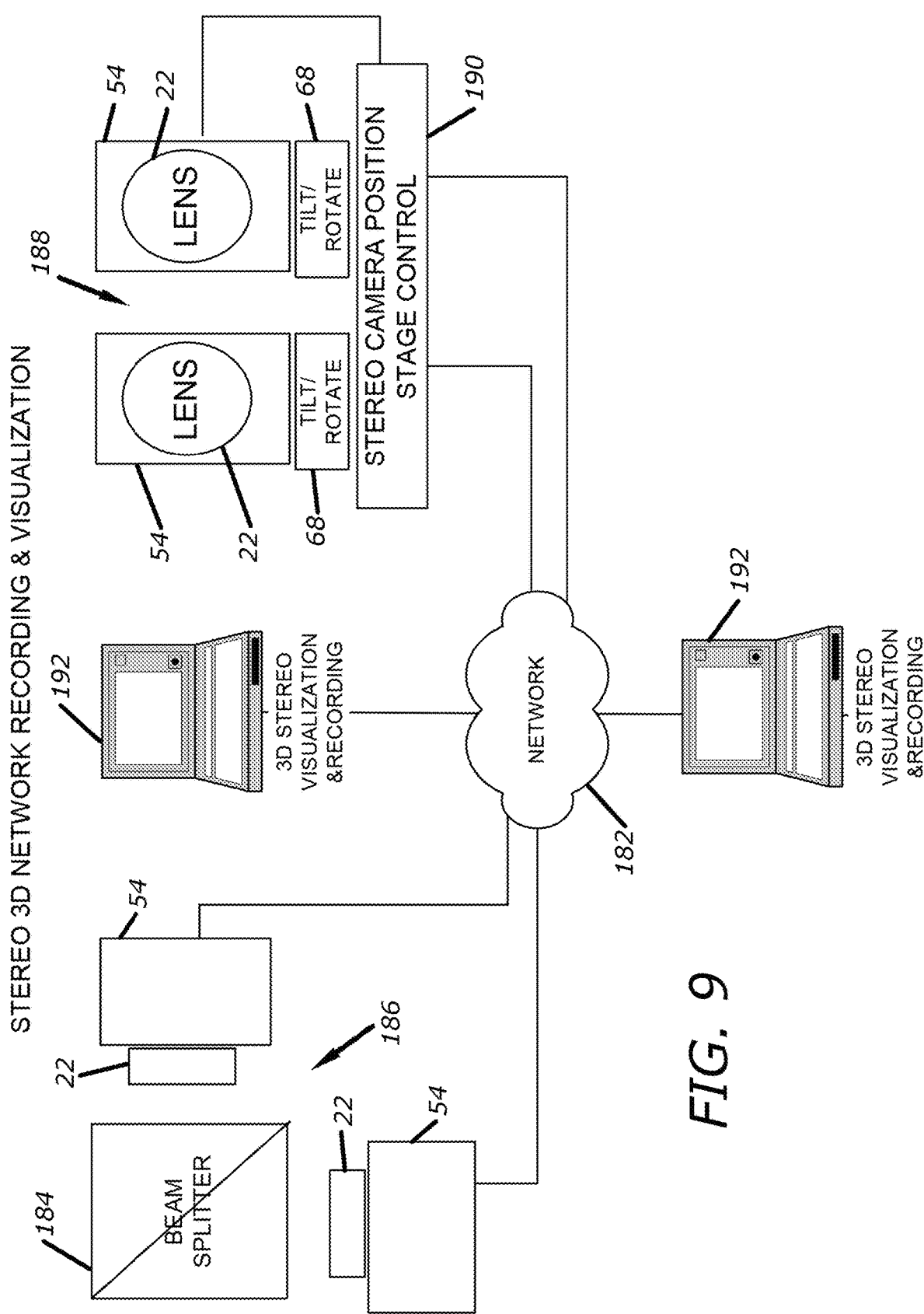
FIG. 9 is a diagram of another embodiment of the digital camera system covering stereo 3D network recording and visualization.

FIG. 9 illustrates an alternate embodiment of the present invention where a digital camera system 180, similar to the digital camera systems 50, 80, 100, 120, 130, 140 and 150, comprising multiple camera modules 54 (e.g., SI-2K MINI) and multiple processing, recording and display sub-systems connected via network 182. The camera modules 54 (e.g., SI-2K MINI) are configured with an optical mount (e.g., a P+S Technik B4 optical mount and Angenieux 19×7.3 BESSDE HR Motorized Lens) and are powered from an external 12 VDC supply or Anton Bauer Hytron 140 Gold mount systems.

A first pair 186 of camera modules 54 (e.g., SI-2K MINI) are mounted for 3D stereo capture of a common scene thru an Edmund Scientific NT46-584 optical beam splitter 184. The two camera modules 54 are cabled together and are synchronized to capture at the same rate and to begin scanning with a common frame start time.

A second pair 188 of camera modules 54 (e.g., SI-2K MINI) are mounted adjacent to each other for 3D stereo capture on a synchronized multi-axis pan, tilt, theta and slide motorized stage system with Newport controllers 190. The motor positions are operated from software 38 either manually, in response to image processing or as a pre-set sequence triggered by events or timers. The system 180 also includes two notebook computers 192 (e.g., Dell Precision M90s) networked using a Cisco Gigabit Router.

The imaging software 38 is the Silicon Imaging SiliconDVR program with multi-camera and stereo visualization, recording and control tools running under Microsoft Windows. Other software tools used by the SiliconDVR for image processing include Microsoft Direct-X graphics, CineFormRAW Codec and Iridas Speedgrade 3D look-up-table software.

The software 38 is running on both notebook computers 192 and can be configured to view and control multiple camera modules 54 using a single display with mixed, stitched or perspective-corrected views. The data from the multiple camera modules 54 can be recorded on either computer 192 or both computers 192 simultaneously with multicasting enabled.

Figure 10:
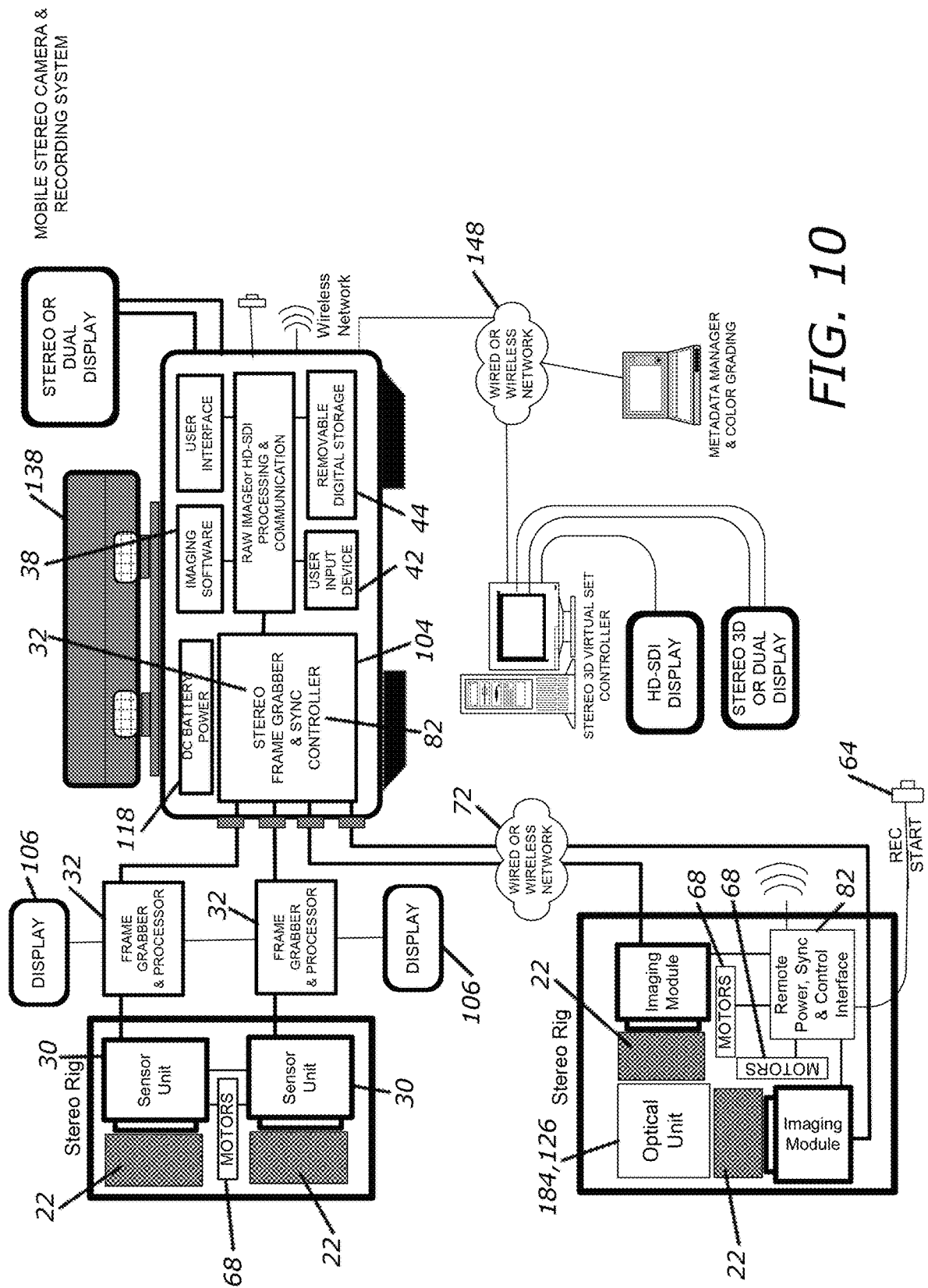
FIG. 10 is a diagram of another embodiment of the digital camera system covering a mobile stereo camera and recording system.

As seen in FIG. 10, another embodiment of the present invention illustrates a digital camera system 200, similar to the digital camera systems 50, 80, 100, 120, 130, 140, 150 and 180 described above, the disclosed Mobile Stereo camera and recording system. It comprises stereo pairs of camera modules, as described in FIGS. 1, 2, 3 and 4 on stereo rigs connected to a Frame grabber processing system as described above in FIG. 8.

Figure 11:
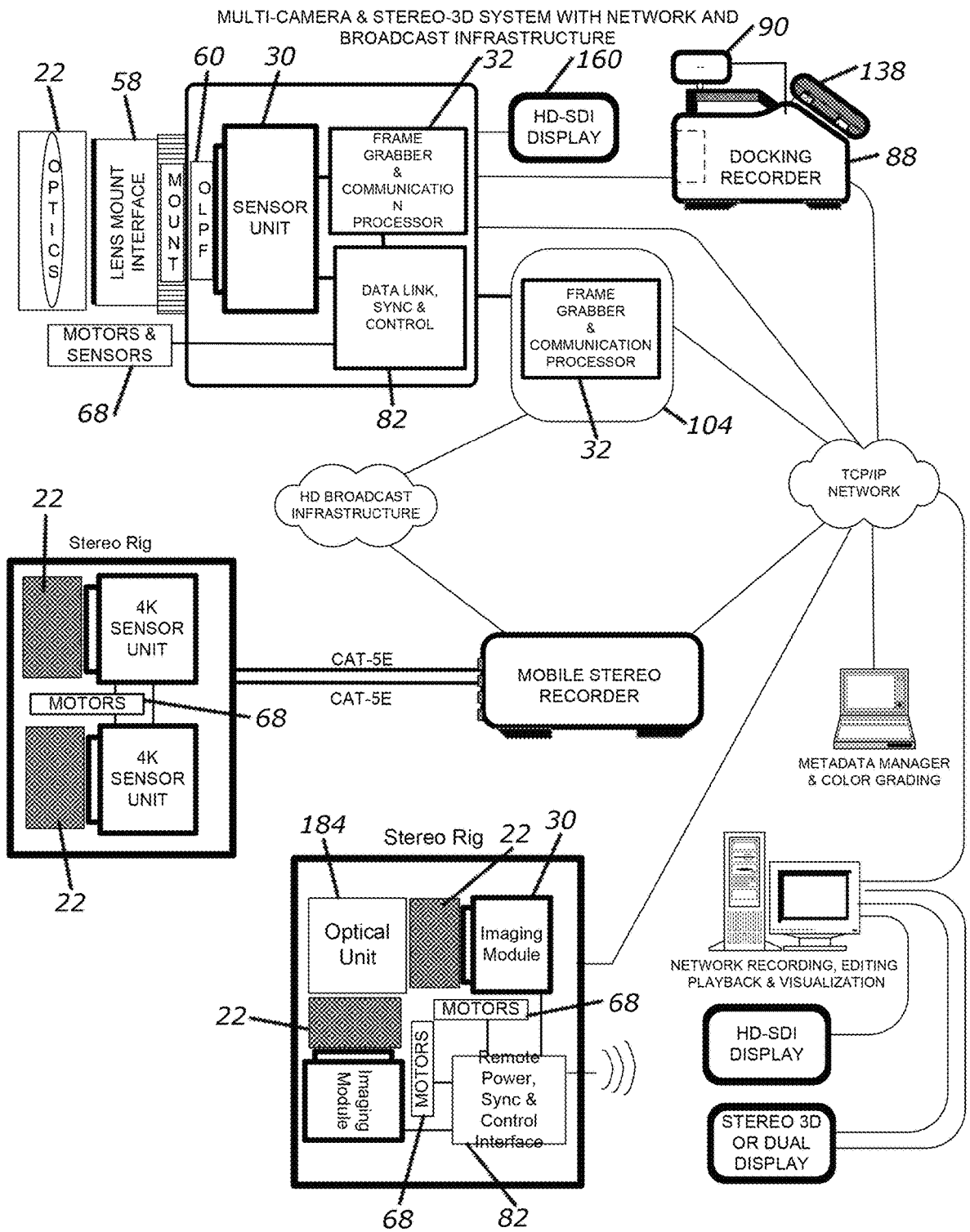
FIG. 11 is a diagram of another embodiment of the digital camera system covering a multi-camera and stereo-3D system with network and broadcast infrastructure.

FIG. 11 illustrates an alternate embodiment of the present invention where a digital camera system 300, similar to the digital camera systems 50, 80, 100, 120, 130, 140, 150, 180 and 200 described above, comprising a plurality of multiple camera modules, stereo rigs, mobile recorders and remote clients operating any of the subsystems via wired or wireless network, producing live 2D or 3D content for broadcast or network streaming.

FIG. 12 illustrates a flow chart 400 for the software 38 described above. The software 38 searches for cameras, including sensor units and camera modules, connected to the acquisition system via a data link, such as network, cameralink and HD-SDI with reverse serial communication and control channel. Once detected, the software identifies the cameras 402 by reading and determines make, model and unique serial number identifier, as well as any metadata stored in the camera or from devices which may be connected, such as sensors, optics, lens control and motion control systems. The software uses then adjusts settings and calibration 404 the unique identifier to load previously generated and stored calibration data for use in the live acquisition video processing software pipeline 406. If the data does not exist, the software can initiate a calibration process to generate new calibration data. The software receives input settings 408 thru the camera hardware or from the software generated user interface, which may be touch-screen controls for adjusting functions such as camera settings, recorder settings, image processing modes, streaming and playback. The software continuously captures images and metadata 410, including audio, external device settings and operator settings. The image is then corrected, using the calibration parameters, including pixel-by-pixel black level correction and defect pixel replacement then packed 412 and placed into a RAM buffer 414 for additional processing. In Live Preview 416, various adjustments represented in the metadata, can be applied to the motion imagery 418 such as white balance, color correction, gamma and three dimensional look-up-tables, such as those generated by tools such as Iridas Speedgrade. Then additional visualization and image processing 420 of the data can be applied such as scaling, zooming, exposure metering, focus enhancing, flipping, keying, guide overlays and stereo mixing. The imagery can then be output to displays. One display may be used for live motion image and operator touchscreen interface 422. Another display can be used for full screen live motion image output with or without overlay or data mixing and alternative visualization and processing 424. In systems with multiple image sources imagery from each source may be output to its own output or mixed for stereo 3D visualization, including driving outputs for mesh projection systems. Display settings such as convergence of dual camera streams can be sent into the recording engine for storage with other metadata. While the live motion image is captured and processed, the software can record and stream the images and metadata 426. Image and metadata captured in the RAM buffer 414 can be accessed for optional encoding, packing and buffering 428 in a first-in-first out basis at a different rate and from a different position of RAM buffer 414 than being accessed by the live preview software engine. The encoding may use Cineform wavelet-based compression engine. The coded or uncoded data can then be written to file in a container format such as Audio Video Interleaved .AVI, Quicktime .MOV or sequence of .DNG or raw images with an extension such as .SIV 430. The file can be written to local or remote storage 432 on a project and auto file sequence naming basis. The file can also be streamed 438 via network 440. For continuous recording, the storage can span multiple storage devices with programmable file size segmentation. The capture or recorded image and data can be retrieved from storage and placed back into the RAM buffer 414 for playback. The playback engine can access the images and metadata from the ram buffer 414 where it can be decoded 446 and unpacked and processed thru the same processing, display visualization and image processing as done during the live process, for display on one or more displays. The playback data may also be combined using image processing and visualization with live image preview images to perform functions such as keying of live action with previously recorded content. The live and playback processing can be done with either single source or multiple sources including stereo playback mixing with live stereo preview. The software reads data 442 from storage 432, 444. The imagery for playback or live preview may also come for another source, streamed 434 via network 436 into the RAM buffer. The recording and streaming engines can also be used for processing of the image processing visualized output content. Although the present invention has been discussed above in connection with use for film and video motion pictures, the present invention is not limited to that environment and may also be used in any environment where digital cameras may be employed including, without limitation, a security camera system, a digital camera system on a robotic vehicle or the like.

Although the present invention has been discussed above in connection with use for film and video motion pictures, the present invention is not limited to that environment and may also be used in any environment where digital cameras may be employed including, without limitation, a security camera system, a digital camera system on a robotic vehicle or the like.

Although several embodiments have been described in detail for purposes of illustration, various modifications may be made without departing from the scope and spirit of the invention.

I claim:

1. A method for encoding or decoding and visualizing raw video and metadata captured by a digital camera or portable recording system, comprising:
   encoding received raw image sensor data at 10-bit or higher depth and 2K or higher resolution at film or video rates;
   combining raw coded video data with audio and metadata into a container for file writing;
   decoding the raw video to decompress the raw video to high dynamic range 10-bit or higher depth video;
   color processing the raw video with white balance or color correction Look Up tables based on the encoded metadata, and outputting the color processed video for visualization with synchronized audio.

2. The method of claim 1, wherein the encoding provides constant quality, variable bit rate encoding to allow rates to rise dynamically for more complex scenes.

3. The method of claim 1, wherein the raw image sensor data is 12-bit or higher depth and 4K or Higher Resolution.

4. The method of claim 1, wherein the raw image sensor data is demosaiced prior to encoding.

5. The method of claim 1, wherein the encoding provides compression of 4K raw video data to a data rate of 1 Gb/sec or lower.

6. The method of claim 1, wherein the raw video data is encapsulated into a Quicktime (MOV) container.

7. The method of claim 1, wherein uninterpolated raw video data is encoded using wavelets.

8. The method of claim 1, wherein the decoding provides for simultaneous editing of multiple streams of raw video and audio.

9. The method of claim 1, wherein the metadata includes encapsulated 3D Look Up tables.

10. The method of claim 1, wherein decoded imagery from multiple streams is synchronized and processed for 3D display on virtual reality (VR) goggles.

11. The method of claim 1, wherein decoded imagery from multiple streams is used to output hemispherical views.

12. The method of claim 1, wherein decoded imagery from multiple streams is used to generate a spherical projected format and output to VR goggles.

13. The method of claim 1, wherein the encoding captures and compresses high speed video at rates at least twice SMPTE standard video rate with metadata to playback at a lower video or film rates.

14. The method of claim 1, wherein the encoding includes a RAM buffer to encapsulate images and metadata starting from different position of RAM buffer with record start event initiation.

15. The method of claim 1, wherein the encoding is configured to output zoom, focus or iris motor position and timecode streaming metadata to a file.

16. The method of claim 1, wherein frames of video are first combined from multiple image readouts during a single frame time to create a high dynamic range frame for compressing.

17. The method of claim 1, wherein frames of video are first combined from multiple image sensor to create a high dynamic range image for compressing.

18. The method of claim 1, wherein the encoding is configured to encapsulate uncompressed or lossless compressed raw, camera metadata and synchronized audio.

19. The method of claim 1, wherein the encoding or decoding is configured to demosaic uninterpolated raw into 4:4:4 or 4:2:2 data, and wherein the encoding of the video is at variable bit rates and at 10-bit or higher depth.

20. The method of claim 1, wherein the encoding includes outputting uncompressed raw video with audio and streaming lens metadata.

21. The method of claim 1, wherein the codec output is visually perfect or visually lossless.

22. The method of claim 1, wherein the encoding includes generating multiple streams, including at least one stream generated at highest quality and at least one additional stream which is demosaiced, color processed and compressed at lower data rates.

23. The method of claim 22, wherein the encoding includes outputting the multiple encoded streams across multiple storage devices.

24. The method of claim 22, wherein the encoding is configured to transmit the lower data rate stream over a wired or wireless network.

25. The method of claim 1, wherein the codec is operated over wireless network for remote control, viewing or playback and metadata management.

26. The method of claim 1, wherein the metadata further includes lens information.

27. The method of claim 26, further wherein the lens information metadata is received through an interchange lens mount which is configured for PL or Canon lens mounts.

28. The method of claim 26, wherein the lens metadata is received through an interchange lens mount which is configured for B4 lenses with integrated optics.

29. The method of claim 1, wherein the encoding further includes receiving coded or uncoded raw image sensor data on a portable touchscreen interface recorder over HDMI.

30. The method of claim 1, wherein the encoding is configured to start a recording using signals received over an HDMI interface.

31. The method of claim 1, wherein the encoding and decoding are performed in a portable digital camera with a unified software or operator interface to control capture, recording, playback, and non-destructive visualization.

32. The method of claim 31, wherein the portable digital camera is part of a digital camera system; and
wherein the digital camera system is configured as a Master or Slave for 3D or Multi Camera operation, and the encoding includes outputting metadata to indicate its mode and left or right eye configuration.

33. The method of claim 1, further wherein the decoding is configured as part of a post-production software program to enable real-time, multi-stream 4K raw editing performance.

34. The method of claim 1, wherein the decoding is configured in a multi-core central processing unit (CPU) personal computer (PC) system with a graphics processing unit (GPU) for display and optional PCIe FGPA or dedicated hardware processor for decompressing and editing raw multi-stream video.

35. The method of claim 34, further wherein decoding and playback can be done on the host multi-core processor or in combination with the additional PCIe processing sub-system.

36. The method of claim 1, wherein the encoding is performed in a digital camera installed as part of a robotic vehicle.

37. The method of claim 36, further wherein the robotic vehicle utilizes Pan, tilt and zoom motors and GPS sensor; and wherein the encoding includes outputting positioning or metadata.

38. A method for decoding and visualizing raw video and metadata captured by a digital camera or raw recording system, comprising:
decoding a container with 10-bit or higher raw video at 4K or higher resolution, audio and metadata;
decompressing and demosaicing the raw video to 10-bit or higher depth;
applying color correction Look Up tables based on the metadata; and
outputting the color processed video with synchronized audio.

39. The method of claim 38, wherein the decoding includes receiving the ray video, audio and metadata which is encapsulated in a Quicktime (MOV) container.

40. The method of claim 38, wherein the decoding includes receiving the raw video in the container as constant quality, Variable Bit Rate encoded data.

41. The method of claim 38, wherein the decoding is configured as part of a post-production software program to enable real-time, multi-stream 4K raw editing performance.

42. The method of claim 38, wherein the decoding is configured to be performed in a multi-core CPU PC system with a graphics processing unit (GPU) for display and a PCIe FGPA or dedicated hardware processor configured for decompressing and editing raw multi-stream video.

43. A method for capturing, recording and visualizing raw images with audio output from a digital camera system on a portable processing, recording and monitoring system, comprising:
providing a unified software with touchscreen operator interface to control the capture, color processing and visualization from one or more digital cameras or imaging modules at 2k or higher resolution;
capturing and encoding raw or color processed images at precise film or video rates at 10-bit or higher color depth; and
recording the raw images with audio to removable storage.

44. The method of claim 43, further comprising receiving raw images and audio transmitted over SDI Coaxial Interface.

45. The method of claim 43, further comprising receiving raw images and audio transmitted over HDMI.

46. The method of claim 43, further comprising starting the recording using a signal transmitted from the camera or imaging module.

47. The method of claim 43, further comprising demosaicing and color processing non-interpolated raw images with scalable resolution and 10-bit or higher color depth output.

48. The method of claim 43, further comprising encoding and recording the raw images with audio and camera metadata into a single encapsulated file.

49. The method of claim 43, further comprising encoding the raw images with constant quality, variable bit rate encoder that allows rates to rise dynamically for more complex scenes.

50. The method of claim 49, further comprising recording the encoded raw images with audio and camera metadata which is encapsulated into a Quicktime (MOV) container.

51. The method of claim 43, further comprising capturing and encoding the interpolated or non-interpolated raw images.

52. The method of claim 43, wherein the encoding is configured to demosaic uninterpolated raw into 4:4:4 or 4:2:2 data and further encode video frames at variable bit rates at 10-bit or higher depth.

53. The method of claim 43, wherein the portable processing, recording and monitoring system includes a display configured to be calibrated using a stimulus and response measurement system to produce a color 3D Look Up table for modification of displayed imagery.

54. The method of claim 43, wherein the portable processing, recording and monitoring system includes a docking modular processor configured to receives camera data and outputs live color processed coded video and audio over Gigabit Ethernet for network streaming.

55. A portable digital camera system comprising:
an optical mount for interchangeable lenses;

an imager with a minimum of 4K resolution and 12-bit bit depth outputting raw image sensor data at film and video rates;

a processor for capturing raw image sensor data and outputting 10-bit or higher raw video data to industry standard cabling interface or coding the raw video data for recording;

and wherein the processor can be further configured to demosaic and color process the raw image sensor data to 10-bit or higher depth for recording on to removable storage media; and a wireless interface for remote camera control or image transfer.

56. The digital camera of claim 55, wherein the raw image sensor data, timecode and audio is transmitted over HDMI interface.

57. The digital camera of claim 55, wherein the digital camera system includes a record input button, and transmits a control signal over the HDMI interface to initiate start of recording in the camera and on a remote processor.

58. The digital camera of claim 55, further wherein camera and lens setting metadata are output over the cabling interface.

59. The method of claim 1, wherein the metadata includes at least one of camera identification, capture settings, and color correction information.

60. The method of claim 38, wherein the metadata includes at least one of camera identification, capture settings, and color correction information.

61. A digital camera system on a robotic vehicle comprising:

an optical assembly with mount for interchangeable lenses or Integrated motorized zoom lens;

an imager with a minimum of 4K resolution and 12-bit bit depth outputting raw image sensor data at film and video rates;

a pan and tilt mechanism for remote positioning the imager and optics;

a GPS sensor;

a processor for capturing raw image sensor data and outputting 10-bit or higher raw video data;

and wherein the processor can be further configured to demosaic and color process the raw image sensor data to 10-bit or higher depth for recording images and positioning metadata on to removable storage media; and a wireless interface for remote camera control or image transfer.

62. The digital camera system of claim 61, further comprising encoding the raw or demosaiced 4:4:4 or 4:2:2 video date with constant quality, variable bit rates to allows rates to rise dynamically for more complex scenes for file writing into a QuickTime container.

63. The digital camera system of claim 61, wherein the processor executes a timed motion and recording event sequence including continuous adjustment of camera system positioning and lens settings.

64. The digital camera system of claim 61, wherein the system operates as a stabilization platform for smooth shots isolated from the movement of the camera operator.

65. The digital camera system of claim 61, wherein the processor is configured to record images as a sequence of Cinema quality DNG images.

66. The digital camera system of claim 63, wherein the imager and optical assembly is removably docked to the processing system.

67. The digital camera system of claim 63, wherein the processor generates multiple streams, including at least one stream generated at highest quality and at least one additional stream which is demosaiced, color processed and compressed at lower data rates.

68. The digital camera system of claim 63, wherein a remote processor provides a unified software touchscreen operator interface to controls the capture, camera positioning and video with GPS metadata visualization over a wireless link.

69. A portable processing, recording and monitoring system, comprising:

an input configured to receive 4k or higher resolution raw digital camera data, audio and lens metadata over HDMI interface;

a processor configured to capture the received raw and demosaicing the received raw into color processed video at precise film or video rates at 10-bit or higher color depth;

wherein the system is configured to encode the raw or color processed video with audio for recording on to removable media; and a unified software with touchscreen operator interface configured to control the capture, 3D LUT color processing and visualization.

70. The portable processing, recording and monitoring system of claim 69, further comprising encoding the raw or demosaiced 4:4:4 or 4:2:2 video date with constant quality, variable bit rates to allows rates to rise dynamically for more complex scenes for file writing into an QuickTime container.

* * * * *